US010688415B2

(12) United States Patent
See et al.

(10) Patent No.: US 10,688,415 B2
(45) Date of Patent: Jun. 23, 2020

(54) FILTERING APPARATUS COMPRISING AN INLET AND AT LEAST TWO OUTLETS

(71) Applicant: Rain Harvesting Pty Ltd, Milton (AU)

(72) Inventors: Anton Lee See, Camp Hill (AU); Shaun Ninness, Hawthorne (AU)

(73) Assignee: RAIN HARVESTING PTY LTD, Milton, Queensland (AU)

( * ) Notice: Subject to any disclaimer, the term of this patent is extended or adjusted under 35 U.S.C. 154(b) by 0 days.

(21) Appl. No.: 15/736,294

(22) PCT Filed: Jun. 9, 2016

(86) PCT No.: PCT/AU2016/050463
§ 371 (c)(1),
(2) Date: Dec. 13, 2017

(87) PCT Pub. No.: WO2016/201493
PCT Pub. Date: Dec. 22, 2016

(65) Prior Publication Data
US 2018/0361276 A1 Dec. 20, 2018

(30) Foreign Application Priority Data

Jun. 19, 2015 (AU) ............................... 2015902372

(51) Int. Cl.
*B01D 29/00* (2006.01)
*C02F 1/00* (2006.01)
(Continued)

(52) U.S. Cl.
CPC ......... *B01D 29/0097* (2013.01); *B01D 17/10* (2013.01); *B01D 29/356* (2013.01);
(Continued)

(58) Field of Classification Search
CPC .... B01D 29/0097; B01D 29/90; B01D 29/56; B01D 2201/60; B01D 29/356;
(Continued)

(56) References Cited

U.S. PATENT DOCUMENTS 4,182,376 A    1/1980  Nilsson
4,476,021 A *  10/1984 Souza .................... B01D 35/02
                                                        210/248

(Continued)

FOREIGN PATENT DOCUMENTS

AU          692835       6/1998
AU     2002300002 A1    1/2004
(Continued)

OTHER PUBLICATIONS

Notification of Transmittal of the International Search Report and the Written Opinion of the International Searching Authority, or the Declaration for International Application No. PCT/AU2016/050463(dated Sep. 9, 2016).

(Continued)

*Primary Examiner* — Madeline Gonzalez
(74) *Attorney, Agent, or Firm* — Jenkins, Wilson, Taylor & Hunt, P.A.

(57) ABSTRACT

An apparatus for filtering solid and/or non-dissolved contaminants entrained in flowing water, the apparatus comprising an inlet for the water containing the entrained solid or non-dissolved contaminants to flow into a filtering chamber; a first outlet for expelling the unfiltered water from the filtering chamber; the filtering chamber further comprising: a curved or corner portion in the filtering chamber providing at least a part of a flow path of water from the inlet to the first outlet such that flow of the water along the curved or corner portion changes the direction of flow of the water; and a filtering screen for filtration of solid and/or non-dissolved (Continued)

contaminants from the influent water thereby allowing passage of filtered water out of the filtering chamber.

13 Claims, 18 Drawing Sheets

(51) Int. Cl.
| | |
|---|---|
| *B01D 29/90* | (2006.01) |
| *B01D 29/56* | (2006.01) |
| *E03B 3/02* | (2006.01) |
| *E03B 1/04* | (2006.01) |
| *B01D 17/00* | (2006.01) |
| *B01D 29/35* | (2006.01) |
| *C02F 103/00* | (2006.01) |

(52) U.S. Cl.
CPC ............ *B01D 29/56* (2013.01); *B01D 29/90* (2013.01); *C02F 1/001* (2013.01); *E03B 1/041* (2013.01); *E03B 3/02* (2013.01); *B01D 2201/60* (2013.01); *C02F 2103/001* (2013.01); *C02F 2301/026* (2013.01); *C02F 2303/24* (2013.01); *E03B 2001/047* (2013.01); *E03F 2201/10* (2013.01); *Y02A 20/108* (2018.01)

(58) Field of Classification Search
CPC ...... B01D 17/10; C02F 1/001; C02F 2303/24; C02F 2301/026; C02F 2103/001; E03B 1/041; E03B 3/02; E03B 2001/047; E03F 2201/10; Y02A 20/108
USPC .......... 210/238, 455, 456, 471, 498, 170.03, 210/172.4, 172.6, 248, 282, 335, 337, 210/338, 315
See application file for complete search history.

(56) References Cited

U.S. PATENT DOCUMENTS

| | | |
|---|---|---|
| 4,855,065 A | 8/1989 | Keeter et al. |
| 2005/0040091 A1 | 2/2005 | Nilsen et al. |
| 2008/0121579 A1 | 5/2008 | Dierkes |
| 2010/0206796 A1* | 8/2010 | Lauer .................. B01D 29/111 210/232 |
| 2011/0041416 A1 | 2/2011 | Schmidt et al. |
| 2011/0303307 A1 | 12/2011 | Block |
| 2013/0233443 A1 | 9/2013 | Kuehneman |
| 2016/0017610 A1 | 1/2016 | Denk et al. |

FOREIGN PATENT DOCUMENTS

| | | |
|---|---|---|
| AU | 2008255229 A1 | 7/2009 |
| CA | 2054024 A | 4/1993 |
| DE | 3812136 A1 | 2/1989 |
| DE | 201 14 247 U1 | 10/2001 |
| EP | 0 901 806 A1 | 3/1999 |

OTHER PUBLICATIONS

Commonly-assigned, co-pending U.S. Appl. No. 16/604,561 for "A T-Piece for Use in a Water Diverter," (Unpublished, filed Oct. 10, 2019).

Notification of Transmittal of the International Search Report and the Written Opinion of the International Searching Authority, or the Declaration for International Application No. PCT/AU2018/050315 (dated Jul. 12, 2018).

* cited by examiner

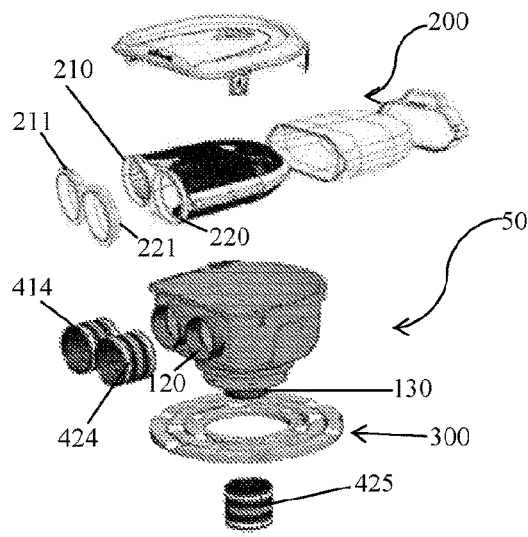
FIGURE 40
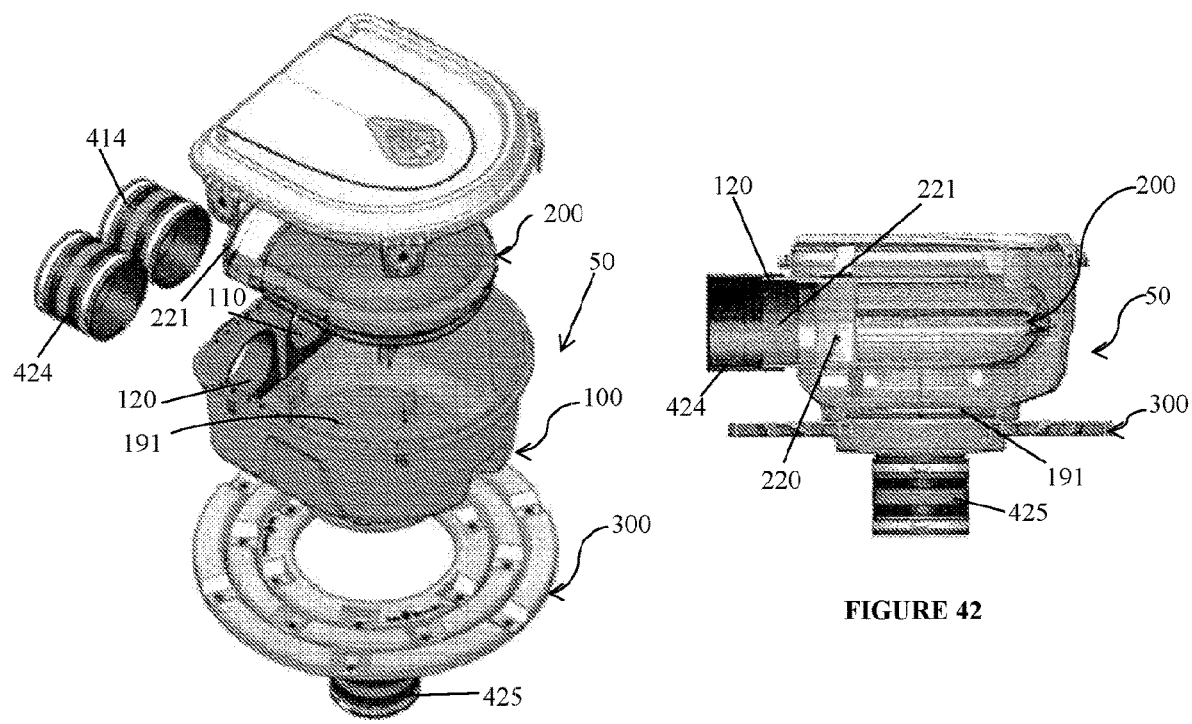
FIGURE 41
FIGURE 42

FILTERING APPARATUS COMPRISING AN INLET AND AT LEAST TWO OUTLETS

TECHNICAL FIELD

The present invention relates to the field of fluid filtering. That is, the filtering of contaminants (particularly, although not exclusively, solid contaminants) from a flow of fluid. It is envisaged that the invention will typically be used in filtering contaminants from rainwater collected from the roofs of buildings and the like, and the invention will be described primarily with reference to its use in this application; however it is to be clearly understood that the invention is by no means limited to this.

BACKGROUND

Water tanks are widely used for storing rainwater collected from the roofs of residential houses, unit blocks and the like. Generally, at least one pipe is used to convey water, which is collected from the roof, so that said water flows off the roof and ultimately (usually down) through the pipe(s) and into the tank. The pipe(s) are typically themselves, or they may be connected to, one or more downpipes extending from the roofs guttering. Thus, rainwater that lands on the roof thereafter flows down off the roof into the roofs guttering. It then flows along the guttering to the nearest downstream location in the guttering where an opening in (or in the base of) the guttering connects to a downpipe. And from there, the water flows through the pipe(s) and ultimately into the tank, as described above.

Water flowing off roofs often contains contaminants like leaves, sticks, rubbish (e.g. plastic bags, wrappers, cigarette butts, litter, and other wind-blown debris) as well as other forms of debris. This can be especially so during the first or initial period(s) of rainfall that immediately follow periods of no rain ("dry spells"), because leaves, sticks, rubbish, etc, can accumulate on the roof during dry spells as there is no rainfall to wash them off. Having said this, the accumulation of leaves, sticks, rubbish, etc, on the roof does not necessarily only occur during long dry spells. This can also be a problem even during periods of regular rainfall (or even constant rainfall, e.g. as leaves and sticks may be blown onto the roof during storms, etc).

One of the ways of stopping or limiting contaminants, which may be contained or carried in any flow of water flowing from a roof, from entering the water storage tank, is to install a mesh at the tank's inlet. Such a mesh typically allows water to pass therethrough into the tank, but it prevents contaminants such as leaves, sticks, rubbish, etc, which are larger than the grade of the mesh, from entering the tank. Therefore, depending on the grade of the mesh (i.e. depending how fine the mesh is) the mesh may also prevent other smaller particulates, or even dust, carried by the water from entering the tank.

In the field of water filters, and particularly rainwater filters, operability of a rain water filter at (or the ability of the filter to accommodate) high flow rates of water passing through the filter is generally considered highly desirable. However, typically, rain water filters or catching devices that are operable at high rain water flow rates have comparatively inferior catchment efficiency. Catchment efficiency refers to the quantity of water captured in e.g. the rain water collection/storage tank (or other receptacle or container) after a rain water filtering or catching operation as a percentage or ratio of the total influent rain water. In other words, a high catchment efficiency means that a high proportion of the total influent contaminated water that enters the filter or catching device is filtered by the filter and ultimately captured in the collection/storage tank or receptacle (and only a small proportion of the total influent water is lost or at least not filtered and collected). On the other hand, a lower catchment efficiency implies that, of the total influent contaminated water that enters the filter or catching device, only a lesser proportion is actually filtered by the filter and ultimately captured in the collection/storage tank or receptacle (and a larger proportion of the total influent water is lost or at least not filtered and collected).

It was mentioned above that rainwater filters or catching devices that are operable at (or which are able to accommodate) high rain water flow rates typically have a comparatively lower catchment efficiency. In a related manner to this, rain water filters or catching devices that have high or very high catchment efficiencies are typically unable to operate at (or accommodate) high water flow rates. Therefore, there is apparently a need for rain water harvesting (filtering) devices that can operate at (or accommodate) high water flow rates and achieve comparatively high catchment efficiencies (or at least comparatively higher catchment efficiencies than is possible with most previous devices).

Another significant issue with rain water harvesting and filtration devices relates to filtration quality. While it is generally desirable to achieve a high quality of captured water (i.e. water wherein the level or amount of remaining contained debris or contaminants is low), in order to do so, such devices need to incorporate fine or very fine meshes or other forms of filters, so as to capture and remove debris and particulate matter that is equal to or above a very small size. Using such fine filter meshes (or other forms of fine filters) often results in a reduction in the catchment efficiency of the device because such filtration (and in particular the speed at which the water can pass through the fine mesh) is usually slower, and it can also results in regular or more frequent blocking or clogging of the filter as contaminants which are removed from water can remain and come to rest on the filter mesh, thereby blocking or clogging it up, which is highly undesirable. In order to overcome the issue of reduced catchment efficiency, filtration quality is often compromised (including intentionally, as a trade-off) by the use of filters which capture only relatively larger sized debris (i.e. debris and particulate matter that is equal to or above a relatively larger size). Therefore, there is apparently a further need for rain water catching or filtering devices that may enable fine filtration of rain water without significantly or severely reducing catchment efficiency.

Another highly desirable feature in rain water filters and catching devices is to reduce the incidences of blocking and/or clogging of the filters, preferably by incorporating a self-cleaning feature or functionality, so that said "self-cleaning" of the device (or its relevant parts or filters etc) may alleviate or reduce the need for regular (often manual) cleaning. In other words, self-cleaning may alleviate the need for users to regularly (manually) collect and remove debris that might otherwise have accumulated on the filtering surfaces of such devices and filters.

Thus, it appears that there has been a long felt need for a rain water harvesting or capturing device which is able to sufficiently (or at least to a greater degree than previously) balance the requirements of being operable at high flow rates and achieve comparatively high catchment efficiency whilst also achieving acceptable filtration quality with self-cleaning capability. It is also thought that there may be a need for a device wherein a user is able to choose or modify the features or functionality of the device depending on the specific requirements of the user in the intended application or installation.

It is to be clearly understood that mere reference herein to any previous or existing devices, apparatus, products, systems, methods, practices, publications or to any other information, or to any problems or issues, does not constitute an acknowledgement or admission that any of those things, whether individually or in any combination, formed part of the common general knowledge of those skilled in the field, or that they are admissible prior art.

SUMMARY OF THE INVENTION

The present invention is directed to an apparatus, which may at least partially overcome or reduce at least one of the abovementioned disadvantages or provide the consumer with a useful or commercial choice.

With the foregoing in view, the present invention in one form, resides broadly in an apparatus for filtering solid and/or non-dissolved contaminants entrained in flowing water, the apparatus comprising an inlet for the water containing the entrained solid or non-dissolved contaminants to flow into a filtering chamber; and a first outlet for expelling unfiltered water from the filtering chamber; the filtering chamber incorporating: a curved or corner portion (in the filtering chamber) providing at least a part of a flow path of water from the inlet to the first outlet such that flow of the water along the curved or corner portion changes the direction of flow of the water; and a filtering screen operable to filter solid and/or non-dissolved contaminants from the influent water such that filtered water is allowed to pass out of the filtering chamber.

The apparatus as just described may alleviate at least some of the issues discussed above by allowing a high flow rate of water through the filtering chamber including during and after high rainfall weather events which often result in a large volume and/or flow rate of water flowing into the apparatus. Providing a filtering chamber in the aforementioned configuration, in particular, may (at least help to) provide allowance for any inadvertent or sudden increase in flow rate of the influent water entering the filtering chamber. Advantageously, the ability to filter quite fine particles, even when the flow rate of influent water is suddenly increased, may not necessarily be compromised (or not as much as with previous devices), because of the configuration of the filtering chamber in the apparatus according to at least some embodiments of the present invention. Furthermore, the apparatus according to at least some embodiments of the present invention may also allow relatively high catch efficiency even during periods of high flow rate as a result of the configuration of the apparatus, which may allow influent water sufficient residence time in the filtering chamber for filtration, and by providing the curved flow path which changes the flow direction of the water in the chamber. This change of direction may result in slowing down the flow of water through the chamber resulting in an increase in overall residence time of the water in the filtering chamber. In this regard, it should be noted that, in some embodiments at least, at least a portion of the filtering screen may be in at least a portion of the curved or corner portion in the filtering chamber.

Importantly, the term "filtering chamber" is not to be interpreted or construed narrowly or as a term of limitation. For instance, one usual definition of the word "chamber" is an enclosed space or cavity. However, as should be readily apparent from above, the filtering chamber in the present invention (and its various embodiments) is clearly not completely closed-off or sealed or the like. On the contrary, it is explained above that water containing entrained solid or non-dissolved contaminants is able to flow into the filtering chamber, and also that unfiltered water can be expelled from (i.e. can flow out of or leave) the filtering chamber. Accordingly, the filtering chamber is clearly not a completely enclosed space—it must have openings to allow (at least) inflow of contaminated water and outflow of unfiltered water. Furthermore, as explained above, the filtering chamber also incorporates (in addition to a curved or corner portion) a filtering screen which is operable to filter solid and/or non-dissolved contaminants from the influent water such that filtered water is allowed to pass out of the filtering chamber. Thus, not only must the filtering chamber have openings to allow inflow of influent contaminated water and outflow of unfiltered water, it must also have a filtering screen for water to pass through (the water thereby being filtered as it does so) such that filtered water can pass out of the filtering chamber.

Thus, without limitation on the scope of the present invention or the particular form that the filtering chamber may take in different embodiments, the filtering chamber might perhaps be thought of as (or it will generally be, in most embodiments) a volume into which influent water containing contaminants can flow, and out of which unfiltered water can also flow, and of course with the proviso that the filtering chamber also incorporates a curved or corner portion and a filtering screen operable to filter solid and/or non-dissolved contaminants from the influent water such that filtered water can pass out of the filtering chamber. Beyond this, no further limitation or restriction or narrow interpretation should be placed on a given to the term filtering chamber.

In many embodiments, the apparatus may further comprise a housing positioned relative to the filtering chamber such that during use filtered water is received into the housing, the housing further comprising a second outlet for expelling filtered water from the apparatus.

The filtering screen mentioned above may form at least a part of a wall of the filtering chamber, and the filtering screen may also (or it may instead) form at least a part of a floor portion of the filtering chamber.

The curved or corner portion mentioned above may substantially reverse the direction of flow of water. In some embodiments, the filtering chamber may be shaped to provide a substantially U-shaped flow path for water flowing from the inlet to the first outlet.

The apparatus may further comprise a secondary filtering screen for further filtration of filtered water that exits the filtering chamber. The secondary filtering screen may be positioned in the housing (mentioned above) such that initially filtered watered (e.g. initially filtered by the filter chamber filtering screen) is further filtered by the secondary filtering screen before being expelled from (the apparatus via) the second outlet.

The filtering screen may comprise perforations of less than 4 mm, and more preferably less than 2 mm, for filtering contaminants (that are sized larger than 4 mm, or 2 mm, respectively). The filtering screen may even comprise perforations for filtering contaminants that are 1 mm or greater. The size of the perforations is, however, in no way limited to the aforementioned sizes or dimensions and may be modified or varied to suit without departing from the scope of the invention.

In some embodiments, the filtering chamber may be removable from the housing (e.g. temporarily for inspection or cleaning or to change configuration as discussed below, or perhaps even permanently). The filtering chamber may have a handle or grippable portion operable to assist removal of the filtering chamber from the housing.

As alluded to in passing above, the filtering chamber may be able to operate in two (or possibly more) different filtering configurations. Where there are two filtering configurations, which may correspond to two alternative installation positions of the filtering chamber, in a first of these configurations (which may correspond to a first installation position of the filtering chamber), a substantially flat perforated wall (or side or portion thereof) of the filtering chamber may form an in use floor of the filtering chamber (this may be, or it may be part of the filtering screen) for filtration of debris from the influent water. This first configuration may be particularly, albeit not exclusively, useful for achieving a comparatively higher quantity of filtered water as a result of the large filtering surface provided by the perforated floor (filtering screen). That is, a comparatively larger quantity of water may be filtered and harvested when the filtering chamber is used in this first configuration.

Again referring to a situation where there are two filtering configurations of the filtering chamber, in a second of these configurations (which may correspond to a second installation position of the filtering chamber), a wall (or side or portion thereof) of the filtering chamber, which forms an in use floor of the filtering chamber in this second filtering configuration (this wall or side (or portion thereof) of the filtering chamber may be, or it may be part of, the filtering screen), may include an inner (central) perforated portion which rises relative to (or out of the plane or level of) a surrounding unperforated portion, and the inner portion may help to define a curved flow path for the flow of water along the unperforated portion. In this second filtering configuration of the filtering chamber, the filtering chamber may also include an outer perforated portion which also rises relative to (or out of the plane or level of) the unperforated portion. This may further assist in defining a curved flow path along the unperforated portion which is between the inner (central) perforated portion and the outer perforated portion (both of which rise relative to (or out of the plane or level of) the unperforated portion). This second filtering configuration may allow an increased rate of flow of water exiting the chamber unfiltered (due to the comparatively reduced filtering surface area), and this may in turn result in a greater amount of solid and/or non-dissolved contaminants that may have accumulated on the filtering screen being washed away by the water flowing out of the first outlet. As a result, even though the efficiency of filtration (or amount of water passing) through the filtering screen may be somewhat lesser in the second filtering configuration (compared to the first filtering configuration), this second filtering configuration may be particularly well (albeit not necessarily exclusively) suited for preventing build-up of debris or non-dissolved contaminants on the filtering screen thereby alleviating the need for (or at least the frequency of) manual cleaning of the filtering screen.

It is important to appreciate the significant advantages that may be associated with the ability of the apparatus to operate in the two different filtering configurations discussed above (which may be the only two filtering configurations or there may be other additional configurations as well). In particular, using the apparatus in the first filtering configuration may be particularly advantageous during climatic conditions when rainfall is relatively low and high water catchment efficiency is desirable (recall from above that a comparatively larger quantity or proportion of water is filtered and harvested when the filtering chamber is used in the first configuration). On the other hand, using the apparatus in the second configuration may be advantageous during climatic conditions when rainfall is relatively high, meaning that high catchment efficiency may be less important and it may be desirable for there to be a greater degree of "self-cleaning" of the filter chamber to prevent build-up of debris or non-dissolved contaminants, and hence at least reduce the need for (or the frequency of) manual cleaning. There may also be a significant advantage in the fact that the apparatus (and in particular the filter chamber) may be capable of installation and use in one, or other, of these filtering configurations, selectably and as desired by the user. The user may therefore be able to choose the configuration that is most appropriate according to the local climate, the current season, the size or nature of the building or other installation, etc, where the apparatus is to be installed and used.

To enable the apparatus to be installed and used in either the first filtering configuration, or alternatively the second filtering configuration, the configuration of the filtering chamber may be such that the substantially flat perforated wall (or side or portion thereof) of the filtering chamber that forms an in use floor of the filtering chamber in the first filtering configuration may be located on one side of the filtering chamber, and the wall (or side or portion thereof) of the filtering chamber that forms an in use floor of the filtering chamber in the second filtering configuration and which includes an inner (central) perforated portion that rises relative to a surrounding unperforated portion may be located on the opposing side of the filtering chamber. Accordingly, in order for the filtering chamber to be installed in the first filtering configuration, the filtering chamber may be installed such that the side thereof with the flat perforated wall (etc) is oriented down to form an in use floor, or alternatively in order for the filtering chamber to be installed in the second filtering configuration, the filtering chamber may be installed such that the side thereof which has the inner perforated portion and surrounding unperforated portion is oriented down to form an in use floor.

At this point it should be noted that, notwithstanding the above discussion of the two (in particular) possible filtering configurations, and the advantages associated therewith, it is to be clearly understood that there may also be other embodiments of the invention where the filtering chamber is adapted to operate exclusively in either the first filtering configuration, or the second filtering configuration, or possibly some variant of one of them, but in any case in one configuration only. In one such embodiment, the filtering chamber may such that, regardless of what position or orientation the filtering chamber is installed in, a substantially flat perforated wall of the filtering chamber forms an in use floor of the filtering chamber, such that the filtering chamber can operate only in a configuration corresponding to the first filtering configuration discussed above. Alternatively, the filtering chamber may be such that, regardless of what position or orientation the filtering chamber is installed in, a wall of the filtering chamber which includes an inner (central) perforated portion that rises relative to a surrounding unperforated portion forms an in use floor of the filtering chamber, such that the filtering chamber can operate only in a configuration corresponding to the second filtering configuration discussed above.

Without limitation or restriction on what is said about this above, the filtering chamber may be an overall or generally "enclosed" filtering chamber (i.e. a generally enclosed or contained volume), albeit having inlet and outlet openings as well as filtering perforations in and/or extending along one or more walls, sides, etc, so as to thereby allow water to be filtered by passing through the wall(s) of (and more specifically through the perforations in) the filtering chamber. In many embodiments, walls on multiple sides of the filtering chamber may be provided with perforations, and in some embodiments walls on all sides of the filtering chamber may have perforations. In these last mentioned embodiments, namely where walls on multiple or all sides of the filtering chamber have perforations, this may mean that in the event of high volumes or flow rates of influent water containing contaminants, during such flow periods water may be filtered by passing through the perforations on the multiple or all sides of the filtering chamber, all at the same time. Thus, during such periods of high flow, water may be filtered by passing through the side of the filter chamber which forms the in-use floor, the side(s) that form in use side edge(s) or wall(s), and even the side that forms the in use roof, all at once. This might be described as three-dimensional filtration (3-D filtration), and it may assist in providing a high catchment efficiency.

In embodiments that include a housing, the apparatus may further comprise a lid for, or as part of, the housing. The lid may be removable for accessing the filtering chamber (or parts of the filtering chamber or other parts of the apparatus) positioned in the housing. The lid may comprise a flange on an underside of the lid, the flange being shaped to engage and retain an outer wall or portion of the filtering chamber when the lid is closed and the filtering chamber is positioned in the housing. This may help to prevent movement of the filter chamber (within or relative to the housing) during use.

The apparatus may comprise (possibly in addition to, or instead of, the lid described above) a locking mechanism for locking the filtering chamber in position within the housing, again, to thereby prevent movement of the filtering chamber during flow of water therethrough. The housing of the apparatus may also comprise a supporting portion for supporting one (or more than one) end or portion of the filtering chamber positioned therein.

In most embodiments and installations of the present apparatus, the inlet will be configured to be connected with a source of the contaminated water and the first outlet will be configured to be connected with a drain (or other outgoing conduit) for the unfiltered water. Where the apparatus includes a housing, the housing may comprise an inlet connector for connecting the inlet to the source of contaminated water; and an outlet connector for connecting the first outlet to the drain (or other outgoing conduit) for the unfiltered water.

In embodiments such as those described above, which include a housing with a second outlet for expelling filtered water from the apparatus, the second outlet may be configured to be connected (directly or indirectly) to a water collecting tank (or other container or receptacle). The said second outlet may be adjustable (or the dimensions thereof maybe adjustable or selectable) for varying (or at least setting the max or limiting) the flow rate of filtered water being expelled therethrough.

The apparatus may further comprise a flexible jacket filter which may be operable to substantially (or perhaps only partly) enclose the filtering chamber. The jacket filter may comprise perforations for providing additional filtration of contaminants from the filtered water exiting the filtering chamber. Preferably, the jacket filter may be operable to be detached from the filtering chamber. Also, the perforations in the jacket filter may be equal to or smaller in size than perforations (or the largest perforations) provided in the filter screen (or any other part of the filter chamber).

The filtering chamber may comprise a plurality of channels along one or more walls or sides of (in) the filter chamber. These channels may assist in guiding (at least some or a portion of the) flow in the curved flow path for the influent water.

In embodiments such as those described above, which include a housing with a second outlet for expelling filtered water from the apparatus, the second outlet may be replaced with two or more secondary outlets. Or, in these embodiments which include a housing with a second outlet for expelling filtered water from the apparatus, the housing may further include a third outlet for expelling filtered water (from the apparatus). At least one of these outlets in the housing may be operable to (optionally) stop or prevent or not allow or limit the flow of filtered water therethrough.

In some embodiments, the filtering chamber may comprise: a first passage portion; and a second passage portion which is oriented relative to the first passage portion such that during use water passing along the second passage portion generally flows in a downwardly sloping orientation (or at least a different angle of inclination, or in a different plane) relative to flow of water along the first passage portion. Preferably, during use, water from the inlet may flow into the first passage portion and unfiltered water flows from the second passage portion to the first outlet. Also, in these embodiments, the inlet may be positioned at a relatively higher vertical position relative to the first outlet. This may allow flow of water in the filtering chamber, from the inlet to the first outlet, to be assisted (at least somewhat) by gravity.

The apparatus may further comprise a water treatment module positioned relative to the filtering chamber such that at least a part (or some) of the filtered water filtered by the filtering screen (or otherwise by the filtering chamber) is treated by the water treatment module. The water treatment module may be provided in the form of a ceramic filtering block or metallic foam such as silver foam. Provision of such a water treatment module may assist in further treatment and/or filtration of the water filtered by the filtering chamber. By way of example, treatment of the filtered water with a water treatment module comprising silver foam in a manner that allows passage of the filtered water through the foam may provide an anti-bacterial treatment to the filtered water. Furthermore, such a water treatment module may be (preferably readily) accessible for replacement or maintenance. The water treatment module may be positioned adjacent to the filtering screen for treating a substantial part (at least) of the filtered water. Preferably, the water treatment module is positioned in the housing such that the filtered water treated by the module is expelled from the second outlet (or other outlet) of the housing.

It to be noted that the scope of the present invention is no way restricted by its end use. Whilst the explanations given above and below describe the use of the apparatus for filtering rain water to be collected in rain water tanks, such use is not limiting. For example, in alternative embodiments the apparatus may find use in filtering drain water that flows back to creeks or river systems thereby improving water quality of creek and river systems. The apparatus may even be used for filtering flows of fluids (and any entrained contaminants therein) other than water.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 40 is a first exploded perspective view of a filtering apparatus in accordance with a fourth embodiment of the present invention.

FIG. 41 is a second exploded perspective view of the filtering apparatus in accordance with the fourth embodiment.

FIG. 42 is a side view of the assembled filtering apparatus in accordance with the fourth embodiment.

DETAILED DESCRIPTION

Figure 7:
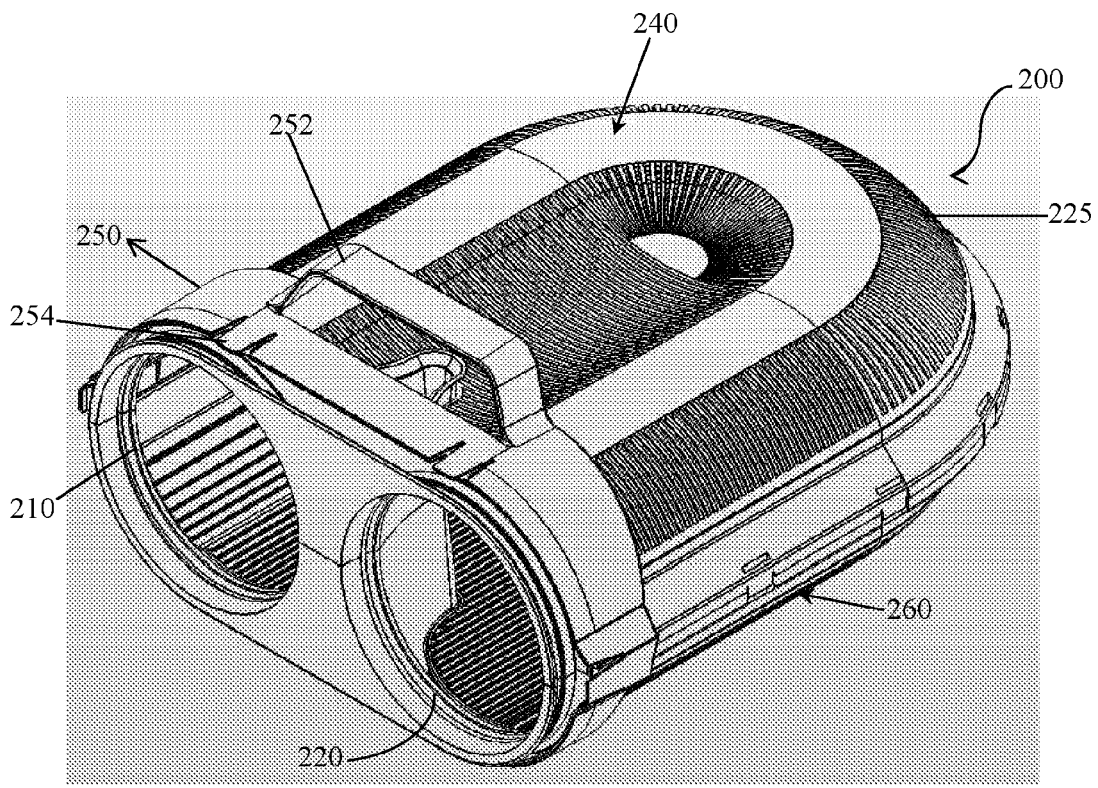
FIG. 7 is a perspective view of the filtering chamber and handle in the first embodiment.
Figure 8:
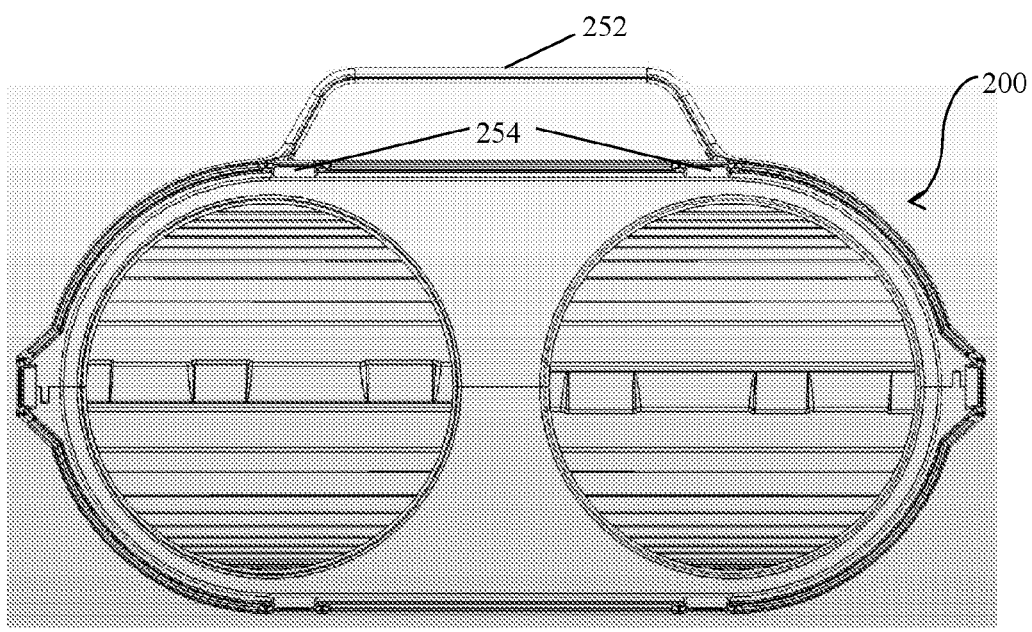
FIG. 8 is a front-end view of the filtering chamber and handle in the first embodiment.
Figure 9:
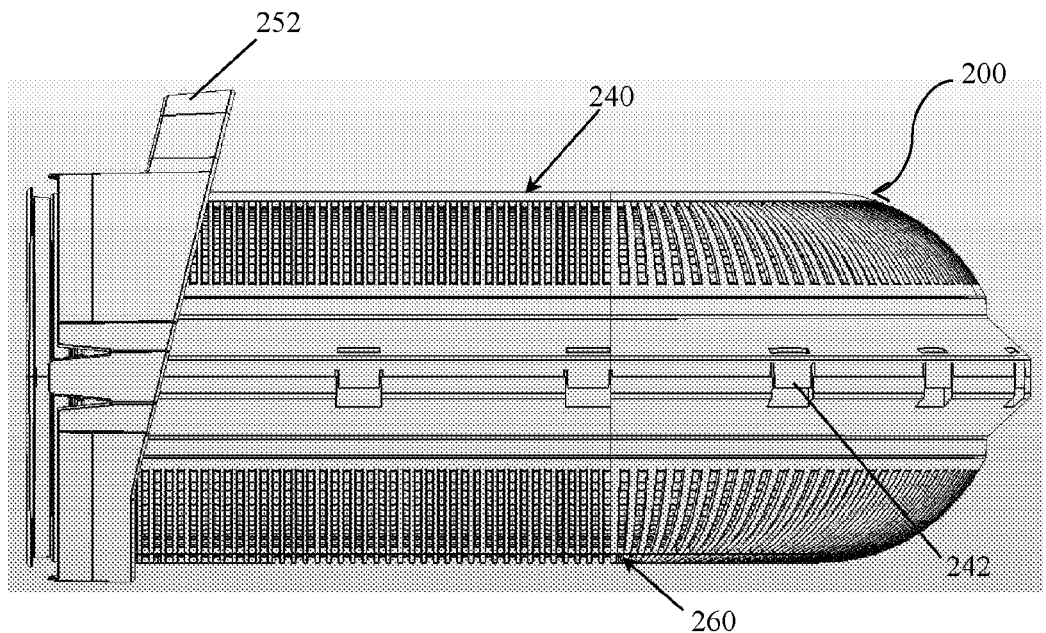
FIG. 9 is side-on view of the filtering chamber and handle in the first embodiment.
Figure 10:
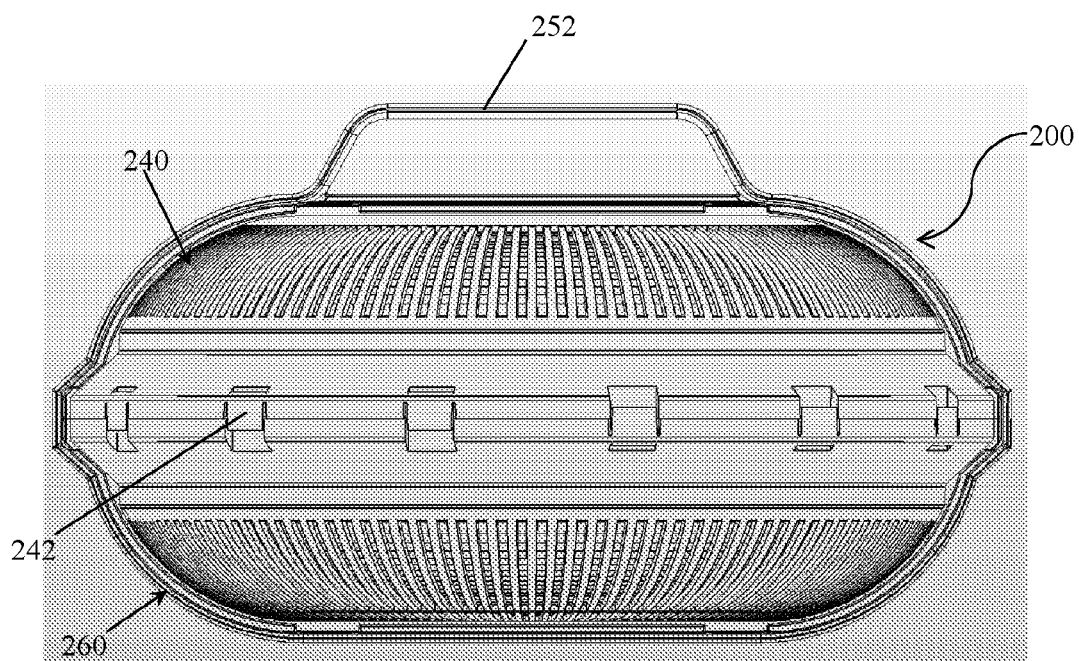
FIG. 10 is a rear-end view of the filtering chamber and handle in the first embodiment.
Figure 11:
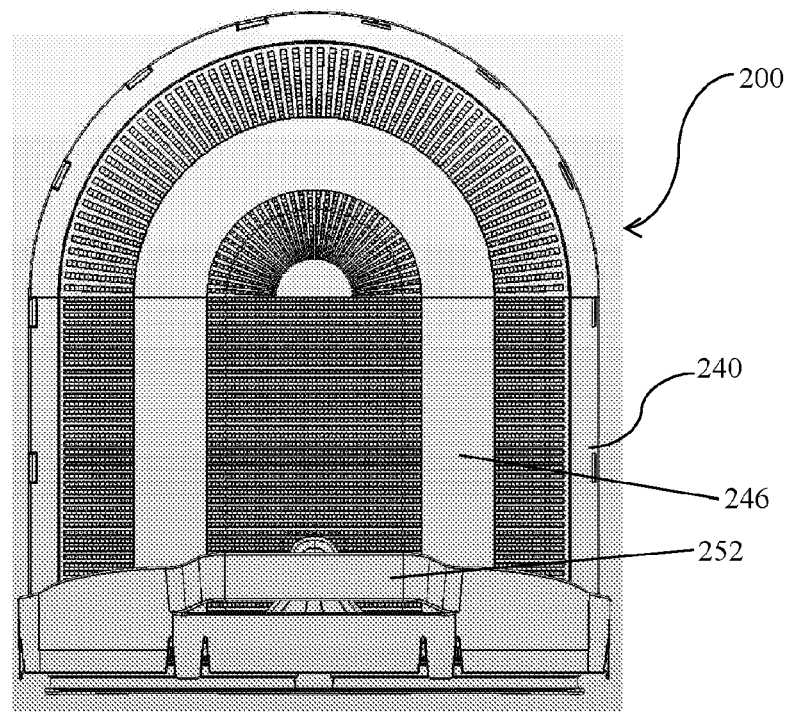
FIG. 11 is a plan view of the outside of one main side or part of the filtering chamber plus the handle, in the first embodiment.
Figure 12:
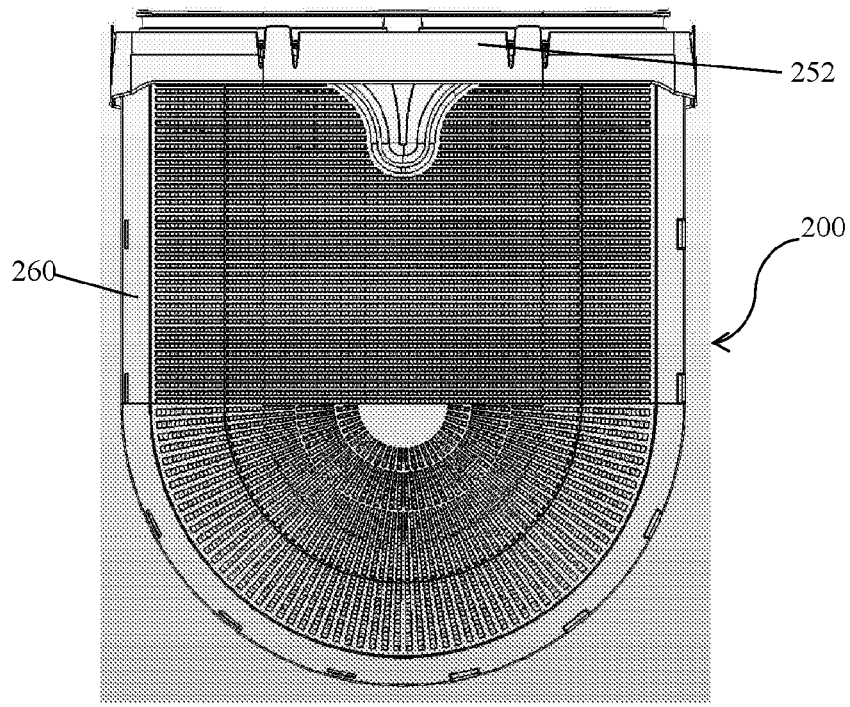
FIG. 12 is a plan view of the outside of other main side or part (the opposite one to the one shown in FIG. 11).
Figure 13:
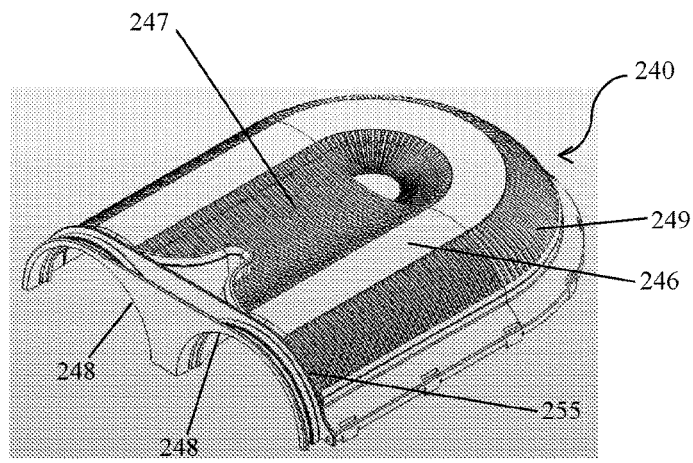
FIG. 13 is a perspective view mostly showing the outside of the first part, which provides one of the main sides of the filtering chamber in the first embodiment.
Figure 14:
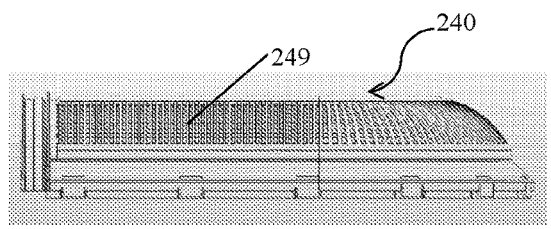
FIG. 14 is a side-on view of the outside of the said first part of the filtering chamber in the first embodiment.
Figure 15:
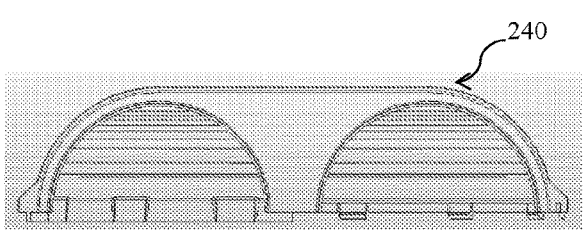
FIG. 15 is a front end view of the first part of the filtering chamber in the first embodiment.
Figure 16:
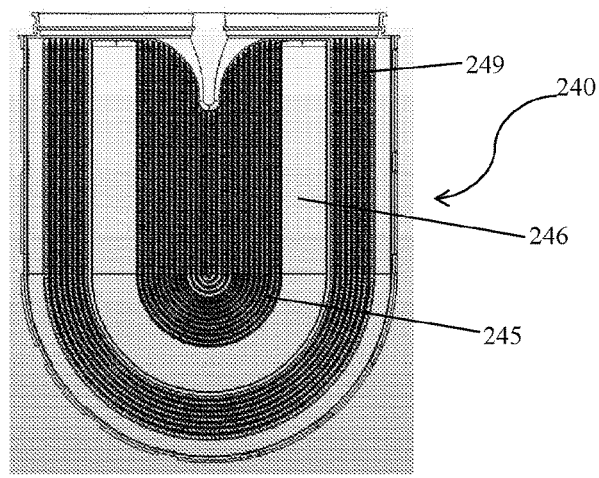
FIG. 16 is a plan view looking down on the inside of the first part of the filtering chamber in the first embodiment.

Referring to FIGS. 1-6, the filtering apparatus 10 in the particular (first) embodiment shown incorporates an outer housing 100 and a filtering chamber 200 located inside the housing 100. The housing 100 has a lid 140 and a base 170. The lid 140 is operable to be locked onto the base 170 using locking clips/latches 180. The filtering chamber 200 has an inlet 210 (see FIG. 7) for allowing contaminated water with entrained debris such as leaves, etc, to flow into the filtering chamber 200. The filtering chamber 200 is hollow and has perforated sides and walls (albeit with some unperforated areas as well), and various portions of the sides and walls may (in different configurations) form a floor portion, side walls, roof/ceiling portion, etc, during use when the filtering chamber 200 is positioned within the housing 100. The perforations in the sides and walls of the filtering chamber 200 are (in this embodiment at least) sized to be less than 4 mm and provide an initial filtering screen to filter any contaminants (larger than 4 mm) that may be entrained in the water flowing through the filtering chamber 200. Any contaminants that are sized greater than 4 mm are caught by/in the filtering chamber 200, but water (the thus filtered water) passes through the perforations (due to the force of the water's flow and/or under the effect of gravity, etc—see below). After passing through the perforations in the filtering chamber 200, the thus filtered water flows (or falls or otherwise travels) into the base 170 of the housing 100 before passing out of the housing 100 (whereupon the filtered water may enter a storage tank or be piped or directed some other way). On the other hand, any water that flows into the inlet 210 but which does not pass through the perforations in the filtering chamber 200 (i.e. any water which goes unfiltered, plus any contaminants contained in this unfiltered water and/or washed off the walls/sides of the filter chamber by this water) proceeds to flow all the way through the filtering chamber 200 and out through outlet opening 220 (see FIG. 7). Therefore the internal space within the filtering chamber 200 provides an open passage for influent contaminated water, and which remains unfiltered, to flow from the inlet opening 210 along and out through outlet opening 220.

Note that, when the filtering chamber 200 is installed in the housing 100 (as can be seen e.g. in FIGS. 2 and 4), the inlet 210 of the filtering chamber aligns with an inlet 110 in the housing 100, and likewise the outlet 220 in the filtering chamber 200 aligns with an outlet 120 in the housing 100. A pipe such as a downpipe (or the like) can connect to the housing inlet 110, such that any contaminated/unfiltered water which is, say, flowing off a roof and down through the downpipe can then enter the apparatus 10 via the inlet 110, and after passing through the inlet 110 said contaminated/unfiltered water then enters the filtering chamber 200 via inlet 210. Likewise, a pipe can connect to the housing outlet 120 such that, any water that has not passed through perforations in the filtering chamber 200 and which therefore goes unfiltered, plus any contaminants contained in this unfiltered water, can flow out of the filtering chamber outlet 220, and through the housing outlet 120 and into this unfiltered water outlet pipe, before being conveyed away to wherever the pipe leads (the pipe may lead direct to sewer or to some other location or facility for further filtering or treatment of the water).

Figure 1:
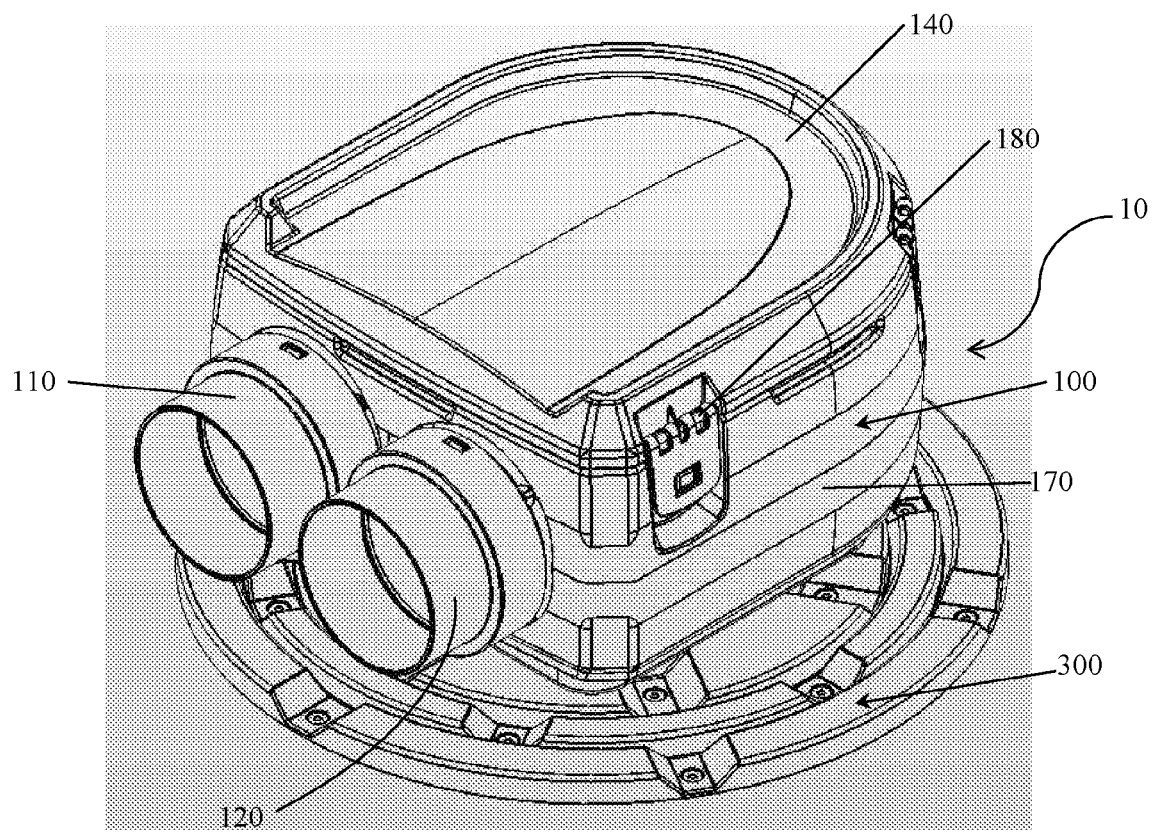
FIG. 1 is a first perspective view of a filtering apparatus in accordance with a first embodiment of the present invention.
Figure 2:
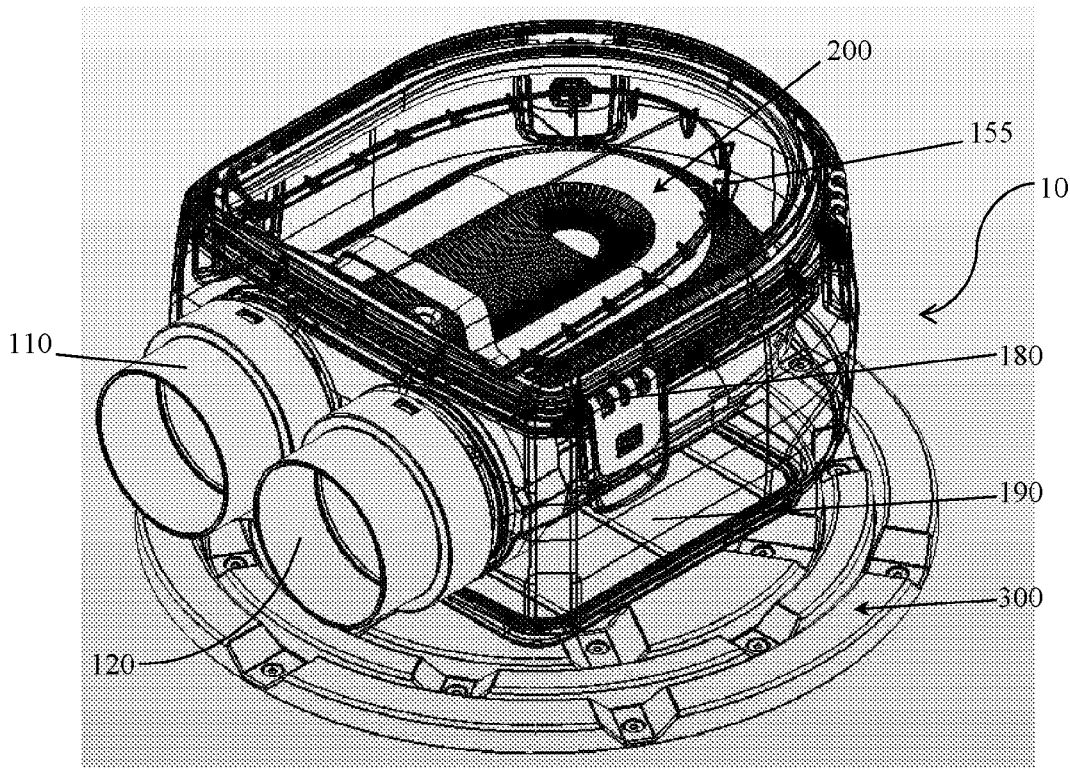
FIG. 2 is a perspective view of the filtering apparatus in accordance with the first embodiment, similar to FIG. 1, except with some parts of the apparatus represented transparently to reveal other parts that would otherwise be hidden from view.
Figure 3:
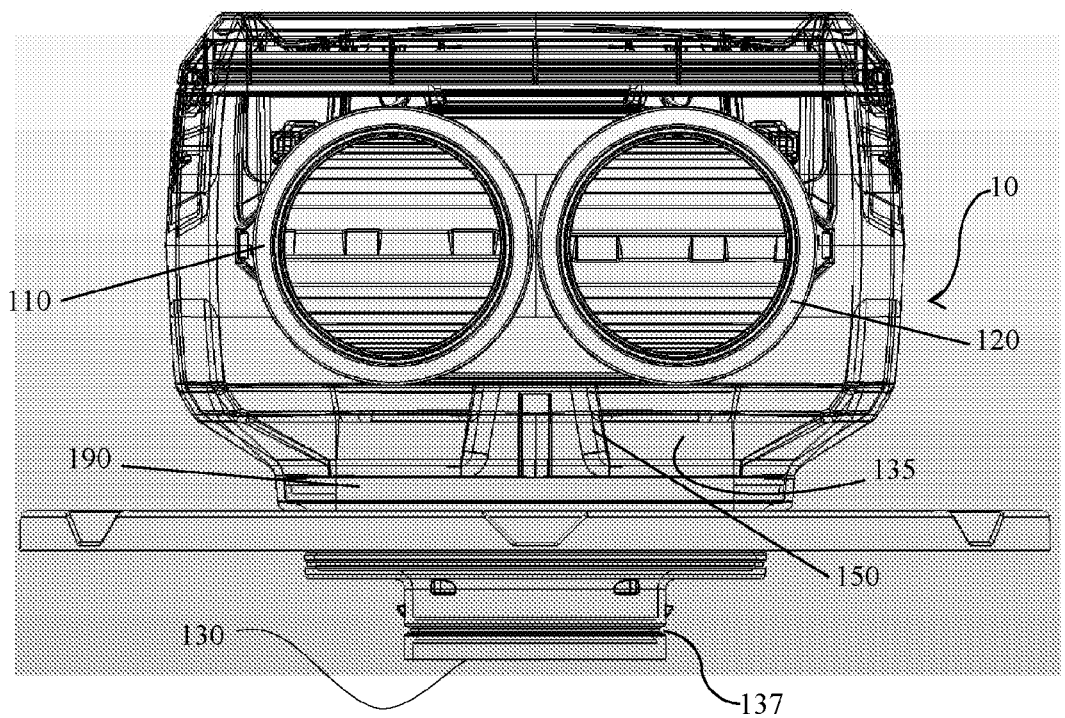
FIG. 3 is front-end view of the filtering apparatus in accordance with the first embodiment.

When the filtering apparatus 10 is assembled, the filtering chamber 200 is positioned inside the base portion 170 of the housing, as can be seen in FIG. 2. The space inside the housing 100 is shaped to not only receive the filtering chamber 200 but also the filtered water that is filtered by, and which flows out through, the perforated floor and walls etc of the filtering chamber 200. After the filtering chamber 200 has been positioned in the base portion 170 of the housing 100, as shown in FIG. 2, the lid 140 is then placed on top of the base 170 to enclose the filter 200 within the housing 100 (and the lid is secured in place using the clips 180), as shown in FIG. 1. There is a gasket that forms a seal between the base 170 of the housing and the lid 140.

The filtering apparatus 10 may be installed in several configurations. In one installation configuration, the overall apparatus 10 may be installed in an approximately horizontal orientation such that the filtering chamber inlet 210 and the filtering chamber outlet 220 are at the same height as one another and the floor of the filtering chamber 200 (in this configuration) is substantially level/horizontal. In this orientation, the direction of flow of any water that flows in through the inlet 210 and which continues unfiltered all the way through the filtering chamber 200 and out of the outlet 220 will necessarily also be generally (or at least approximately) horizontal overall. However, in this configuration (and other configurations too) a significant proportion of the contaminated water that flows in through the inlet 210 will not continue all the way through the filtering chamber and out through the outlet 220 unfiltered. Rather, after entering the filtering chamber 200 through the inlet 210, somewhere in between the inlet 210 and the outlet 220, it will be filtered by passing through perforated portions in the floor and/or side walls and/or ceiling/roof of the filtering chamber. Water that passes through perforated portions in the floor in particular will often do so at least in part due to the effect of gravity (recall that the floor is generally horizontal in this configuration), although the force of the water's own flow may also assist with urging or forcing at least some water through the perforated portions in the floor. In this (horizontal) configuration, any water that is filtered by passing through perforated portions in the sidewalls (and/or especially through perforated portions in the roof) of the filtering chamber 200 will generally do so at least partly (possibly largely) under the force of the water's own flow or water pressure. Note that, in applications where the present device may be intended or suitable for use, the flow rate of influent contaminated water could be quite, or even very, high. Having said this, such periods of high or very high flow may sometimes be intermittent and last for only a relatively short period of time (e.g. minutes or hours)—this is especially so for example following a heavy downpour of rain and when the water entering the device (or a single one of the devices) is collected from a large area of roof. On the other hand, the apparatus may also be able to accommodate less intermittent (or more regular) or even constant flow, even high flow. In any event, the point is that the design of the device is such that these high, or even very high, flow rates can be accommodated. And in fact, as mentioned above, the force behind the flow of water itself can help to urge or force water through perforated portions in the side walls and roof in particular of the filtering chamber 200. Accordingly, high flow rates may in fact help to increase the proportion of the total influent water which passes through perforations in the filter chamber (and thus is filtered), rather than passing through and out of the outlet 220 unfiltered.

Another design feature which also helps to significantly increase the proportion of water that is filtered, at least for some forms of flows (typically higher flow rates) within the filtering chamber, is the U-shaped bend in (or the U-shaped end of) the filtering chamber 200. The effect of this U-shaped bend/end, especially at high water flow rates, is to create centrifugal force on or within the water as the flow of water passes through (i.e. flows around) the U-shaped bend/end in the filtering chamber 200. The higher the flowrate/velocity of the water, the higher the centrifugal force as the flow passes around the U-shaped bend/end, and the higher the centrifugal force, the more water is likely to be urged/forced out through the perforations in the outside wall of the curved portion of the U-shape. Accordingly, at high flow rates especially, water will be forced through the perforations in the outside wall of the curved portion of the U-shape of the filter chamber (and also possibly through the floor and the roof in or near the curved end due to centrifugal force or general water pressure) thereby being filtered as it does so.

Advantageously, in the horizontal overall installation configuration of the apparatus, as described above, during use water which is collected (e.g. rainwater from the roof of, say, a large industrial building, which may contain large amounts of rubbish and debris) enters the device through the contaminated fluid inlet opening 210. As the water flows in through said inlet 210, the water (but not the rubbish or debris) can pass through the perforated floor, walls, etc, of the filtering chamber 200. Any water that does so (i.e. any water that is filtered in this way) initially then passes down through a receiving portion 135 of the housing 100, which is towards the bottom of the base 170, before then flowing out through the second ("clean water") outlet 130 through which filtered (i.e. "clean") water exits the filtering apparatus 10. Any water that does not pass through the perforated walls, etc, of the filtering chamber 200 will instead continue to flow all the way along the passageway formed by the walls of the filtering chamber 200, and then out through the contaminated fluid outlet 220. Rubbish and debris etc larger than the perorations (which naturally cannot pass through the filtering screen/perforations) are also carried out through the contaminated fluid outlet 220 by this flow of water. This automatic/natural removal of rubbish, debris, etc, by the flow of un-filtered water is referred to by the applicant as "self-cleaning".

In a slight alternative or variant mode of operation (compared to that described above), the outlet 220 (or housing outlet 120) may be fully or partially closed (this may be done by any suitable means—not shown) so as to increase the catchment efficiency of the apparatus 10. During operation in this mode, the influent water again enters the chamber 200 through inlet 210. If, however, the outlet 220/120 is fully (completely) closed off, the consequence of this is that substantially all of the influent (contaminated) water must be filtered by the filtering chamber 200 because no water is allowed to exit the chamber 200 unfiltered through outlet 220/120. It may be appreciated that if this "fully closed off" mode of operation is used, or if it is used for extended periods, there may be a need to (e.g. periodically or occasionally) remove the filtering chamber 200 from the housing 100 for cleaning (as the inability of water to exit the outlet 220/120 prevents "self-cleaning" from occurring) or alternatively there may be a need to occasionally open or partially open the outlet 220/120 to allow (at least some) self-cleaning of the filtering chamber 200 to occur. It was mentioned above that the outlet 220/120 may also be partially closed. In this mode of operation (i.e. where the outlet 220/120 is partially, but not completely, closed), some water will still be able to exit the outlet 220/120 (or perhaps some water may be able to exit the outlet 220/120 if the flowrate of water exceeds a certain level), and therefore a degree of self-cleaning will still be possible (at least when water is able to exit the outlet 220/120). However, when the outlet 220/120 is partially closed, this means that at least some water that would otherwise have flowed all the way through the filtering chamber 200 and out through the outlet is prevented from doing so. Accordingly, the amount or degree of "self-cleaning" that the device is capable of may be reduced by this; however the trade-off is that by preventing at least some water from exiting the outlet 220/120, a greater amount of water may be forced to pass through the perforations in the walls, floor, etc, of the filtering chamber 200, thereby increasing the catchment efficiency compared with the situation where the outlet 220/120 is completely open (unblocked). As a further alternative a spring-loaded cover (or similar) could be provided over the outlet 220/120 such that, if there is low flow rate (and therefore low water pressure against the spring-loaded cover from inside the chamber), the spring may be strong enough to keep the cover closed and thus the cover will continue to substantially block flow through the outlet 220/120. However, in the event of a large flow (and therefore greater pressure against the spring-loaded cover from within the chamber), or also possibly in the unlikely situation where the entire filtering chamber is mostly or entirely blocked (so that no water can filter through its perforations), the consequent pressure build up against the spring-loaded cover from within the chamber may override the spring force forcing the cover open, thereby allowing water to flow out through the outlet 220/120.

As shown in the illustrations, and as has been mentioned previously, the walls of the chamber 200 are provided with perforations on the floor portion (or whichever side happens to be functioning as the floor in a given configuration), and also on the side walls and the roof portion (opposite side from the floor). During periods of high flow rates of influent water entering the chamber 200 through inlet 210, and even if the outlet 220/120 is open (i.e. not closed as mentioned above), water is filtered through these perforations and filtration is not limited to the floor portion of the chamber 200. For example (and continuing to refer to the above-mentioned horizontal installation configuration), during very high flow rates, or when the outlet 220/120 is closed, the chamber 200 may be occupied (filled) almost completely by influent water as a result of which water may be filtered and exit not only vertically down through the perforations in the floor, but also horizontally through the perforations in the walls of the chamber and even vertically upwards through the perforations in the ceiling/roof. Thus, water may pass through the perforations in the filtering chamber 200 in all directions. The applicants refer to this functionality as 3-dimensional filtration because the chamber 200 enables filtration of the influent water in directions in all three physical (X,Y,Z) dimensions. In circumstances where this occurs as a result of the outlet 220/120 being closed, this (i.e. the ability of the apparatus to filter more water through three-dimensional filtration) also helps to prevent pressure from building up due to the closed outlet 220/120.

An advantage provided by the filtering apparatus 10 is that the flow of water (and the contaminants carried in it) does not simply impinge on a flat filtering screen like in e.g. many conventional water tank inlet filtering screens. It will also be understood or recalled that one of the disadvantages with these conventional flat tank and similar filtering screens is that debris can become stuck on or build up on the screen causing the screen to become clogged. Furthermore, with these conventional flat filtering screens, when the screen becomes blocked or clogged due to the build up of debris and contaminants thereon, water which then hits the (blocked) screen typically bounces or flows off the side of the screen unfiltered, rather than passing through the screen into the tank, and typically any water that bounces or flows off the screen simply splashes to the ground or is otherwise lost. In contrast, with the present filtering apparatus 10, contaminated water (i.e. water containing entrained debris, etc) enters through the contaminated fluid inlet 210 and then filters out through the perforated walls and floor, etc, of the filtering chamber 200. Any water that does not pass through the perforated walls and floor of the filtering chamber continues to flow along the passageway within the filtering chamber 200, and then ultimately flows out through the contaminated fluid outlet 220 (assuming the outlet 220 is at least partially open). Importantly, providing such a flow path, and in particular an outlet, for unfiltered water means that even the unfiltered water (water which does not pass through the perforated walls and floor of the filtering chamber 200) still does not simply "spill" or otherwise become lost or wasted. Instead, such un-filtered water exits through the housing by the contaminated fluid outlet 120 and can thereafter (rather than simply being lost) be piped to sewer or directed for treatment in some other manner. That is, a pipe which leads to the sewer or some other device or location for further treatment can be connected directly to the outlet 120.

Also, because any contaminants carried by the flow of unfiltered water can simply carry on out through the contaminated fluid outlet 120, the apparatus of the present invention is self-cleaning and consequently much less likely to become blocked. It may sometimes be (albeit not necessarily always) that the degree or extent of self-cleaning is dependent (at least to some extent) on the flowrate of the unfiltered water passing through the passageway in the filtering chamber (i.e. the amount of self-cleaning that occurs may be lower, or it may not occur much at all, if the flowrate is not sufficiently high). Nevertheless, even if this is the case, because the rate at which fluid will often (or at least sometimes) flow through the device is high, the apparatus very often will be (at least to some extent) self-cleaning, at least during periods of high flow rate. In any case, even if the perforations in the filtering chamber 200 were to become blocked over time (e.g. by the gradual accumulation or aggregation of a small particulate matter blocking up the perforations), the filtering apparatus 10 as a whole still will not become blocked. Water can still enter the inlet 110 and exit the first outlet 120, and even if the water is largely unfiltered and little or no filtered water is collected. Thus, even if the perforations in the filtering chamber 200 were to become blocked, nevertheless the overall flow of water can continue without any blockage occurring in the device that might otherwise cause a flow constriction leading to pressure build up, bursting or other damage.

As has been mentioned (or at least alluded to), the internal space within the filtering chamber 200 is shaped with a curved portion 225 (in the embodiments in the Figures the curve is the curved part of the chamber's U-shape) to provide a curved flow path for the water flowing in the chamber 200. In addition to what has been said about this above, the curved portion 225 provides benefits in that because of the curved shape, any flow of water (and any contaminants contained therein) flowing inside the chamber will necessarily have to change direction as it flows through this curved portion. The curved portion assists in slowing down the speed of flow of water in the chamber 200. As a result of this change in speed and momentum of the flowing water, the residing time of the water in the chamber 200 (i.e. the amount of time that the water is inside the chamber 200) increases which in turn helps to increase the amount of water that is filtered through the perforations in the walls and sides etc of the chamber 200.

Referring to FIGS. 7 to 19 in particular, these provide more detailed views of the filtering chamber 200 described above and shown in the apparatus 10 in FIGS. 1-6. The filtering chamber 200 in FIGS. 7-19 comprises (or is assembled from) two parts, namely a first part 240 and a second part 260, that are attached together to form the filtering chamber 200. Each part 240 and 260 comprises a generally convex and overall U-shaped "half shell", each with a range of perforations, such that when the two parts 240 and 260 are attached to each other as shown in FIGS. 7-10 (with their concave sides each facing in towards the other and such that their respective outer rims come together), they together define an enclosed chamber 200, albeit a chamber with perforations in (and extending through) most areas on the chamber's walls, as discussed above and further below. The outer perimeter side of the overall chamber 200 thus formed is shaped in a manner that resembles the outer side of a circular tube that has been bent into a U shape. The outer perimeter side shape of the overall chamber 200 therefore has two substantially straight long edges which are joined by a substantially semicircular portion (technically the connecting semicircular portion might be more accurately described as being shaped to resemble the outside of a toroid that has been cut in half along an axial plane of the toroid). At the front of the chamber 200, the two openings in the chamber, namely the contaminated water inlet 210 and the contaminated water outlet 220, are both circular. This fact, namely the fact that the two openings 210 and 220 are side-by-side and circular, further contributes to making the chamber 200 appear to resemble a perforated tube of circular cross-section that has been, in effect, bent in half into a U shape. However, it is important to recognise that the chamber 200 is not, in fact, simply a perforated U-shaped tube. Indeed, if the chamber 200 were simply a perforated U-shaped tube, each of the "would-be" straight portions or "legs" of the said U-shape would be separated from each other by walls dividing one of the said "legs" from the other (i.e. there would be separating walls between the said "legs"). However, as will be evident from an inspection of FIGS. 11-19 in particular, for the bulk of the volume inside the chamber 200, there are in fact no internal walls separating or dividing different parts of the internal volume. Accordingly, whilst the outer perimeter edge shape of the chamber 200, and it's circular openings 210 and 220, may make the chamber 200 look like a perforated U-shaped tube (i.e. one might assume this is what it is at first glance from the outside), in fact the chamber is not a U-shaped tube because the space/volume inside the chamber 200 is essentially a single open (i.e. undivided and un-separated) volume.

Referring to FIGS. 13 to 16, the first "half shell" part 240 comprises an inner (central) perforated portion 245/247 which rises or extends towards the inside of the filter chamber 200 relative to (or out of the plane or level of) a surrounding unperforated (a.k.a. "river") portion 246. When the first part 240 and the second part 260 are connected together to form the filtering chamber 200, and when the filtering chamber 200 is installed in the housing 100 for use in an orientation (configuration) whereby the first part 240 forms the in use floor of the filtering chamber (or at least where the first part 240 is on the bottom or oriented downwards), in this/these configurations(s) at least the raised inner portion 245/247 helps to define a curved flow path for the flow of water around the raised portion 245/247 and along the unperforated river portion 246. The first part 240 also has an outer perforated wall portion 249 which also rises relative to (or out of the plane or level of) the unperforated river portion 246. This relatively raised outer wall portion 249, which forms part of the overall outer perimeter side edge of the chamber 200, further assists in defining a curved flow path along the unperforated river portion 246 which is between the raised central perforated portion 245/247 and the outer perforated raised wall portion 249.

The previous paragraph refers to a configuration in which the assembled filtering chamber 200 is installed in the housing 100 in an orientation whereby the first part 240 forms the in use floor of the filtering chamber, or at least where the first part 240 is oriented downwards or (mostly) on the bottom relative to the rest of the filtering chamber 200. This particular configuration corresponds to what was described as the second filtering configuration in earlier sections above. And as explained in earlier sections above, the second filtering configuration may allow an increased rate of flow of water exiting the chamber 200 unfiltered, compared to the first filtering configuration (which is discussed above and further below). The comparatively increased rate of flow of water exiting the filtering chamber 200 unfiltered in the second filtering configuration is due to the comparatively reduced filtering surface area on the floor/bottom of the chamber 200, as a result of the river portion 246 which is unperforated. By way of further explanation, in the second filtering configuration, whilst water can still filter through the raised central perforated portion 245/247 and also to the raised perforated side walls 249 (and even through the perforations in the second part 260 which form the upper walls and roof), nevertheless water cannot filter directly through the unperforated river portion 246. Instead, water which is located on or just above the river portion 246 will flow along the unperforated river portion, hence the comparatively increased rate of flow. And this comparatively increased rate of flow may in turn result in a greater amount of the solid and/or non-dissolved contaminants entrained in the flow, or that may have accumulated on the filtering screen, being washed away by the water that flows unfiltered along the river portion 246 and out of the outlet 220. As a result, even though the efficiency of filtration (i.e. the amount of water passing) through the filter chamber may be somewhat lesser in this second filtering configuration (compared to the first filtering configuration discussed in previous sections above and also discussed further below), this second filtering configuration may be particularly well suited for preventing build-up of debris or non-dissolved contaminants on the filtering screen.

Figure 17:
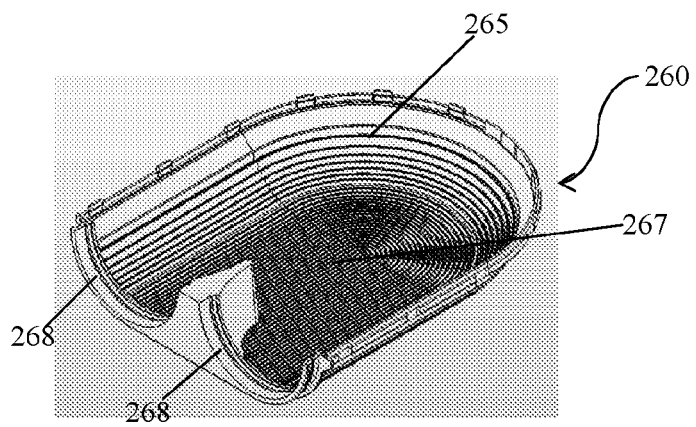
FIG. 17 is a perspective view mostly showing the inside of the second part, which provides the other main side of the filtering chamber in the first embodiment.
Figure 18:
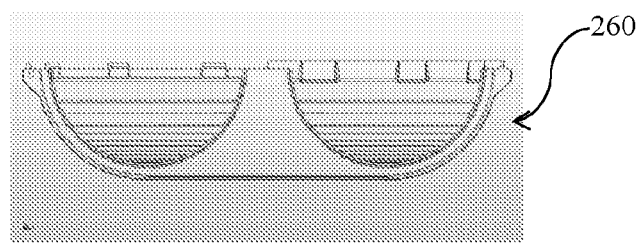
FIG. 18 is a front-end view of the second part of the filtering chamber in the first embodiment.
Figure 19:
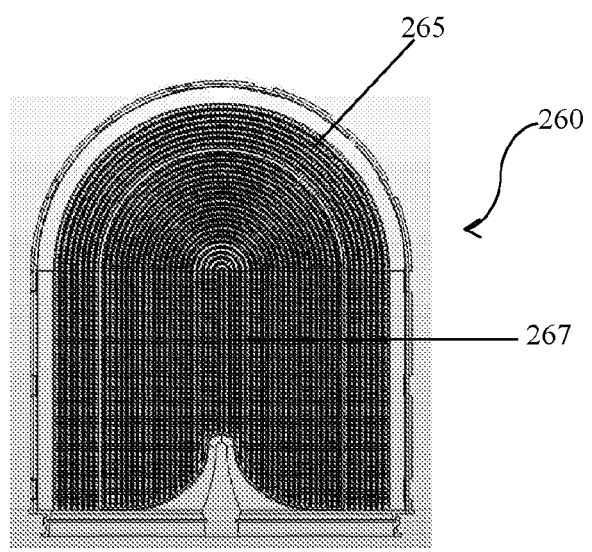
FIG. 19 is a plan view looking down on the inside of the second part of the filtering chamber in the first embodiment.

As shown in FIGS. 17-19, the second "half shell" part 260 comprises a generally flat U shaped middle portion 267, which is perforated all over (i.e. there are no solid or unperforated parts or areas in the middle portion 267), and the flat middle portion 267 is surrounded by rising curved side walls 265 extending upwardly relative to the flat middle portion 267. The rising curved side walls 265, again, form part of the overall outer perimeter side edge of the chamber 200.

The assembled filtering chamber 200 may also be installed in the housing 100 in an orientation, different to that described immediately above, whereby the second part 260 forms the in use floor of the filtering chamber, or at least where the second part 260 is oriented downwards or (mostly) on the bottom relative to the rest of the filtering chamber 200. This particular configuration corresponds to the first filtering configuration discussed in earlier sections above. Compared to the second filtering configuration discussed above, the first filtering configuration provides improved (increased) catchment efficiency (i.e. a greater proportion of the influent water is filtered while a lesser proportion passes into the filter and out again unfiltered), although this improved catchment efficiency comes at the expense of somewhat reduced self-cleaning. The increased catchment efficiency (i.e. greater amount of filtration) achieved in the first filtering configuration arises due to the comparatively greater filtering surface area on the floor/bottom of the chamber 200, because there are no solid or unperforated portions on the floor/bottom of the chamber. Consequently, after water enters the filtration chamber 200 (after entering through the inlet 210) regardless of what portion of the second part 260 the water then flows onto or over the top of, the water will necessary become located on or above a perforated area, and therefore gravity (at least) will tend to cause water to fall through the perforations, being filtered as it does so. Because a comparatively greater proportion of water is likely to be filtered in this first filtering configuration (compared to the second filtering configuration discussed above), it follows that comparatively less water is likely to flow out of the filter chamber 200 unfiltered, and consequently the improved catchment efficiency achieved by the first filtering configuration is likely to come somewhat at the expense of self-cleaning ability (as less unfiltered water leaving the filtering chamber means less flow to carry debris and contaminants out with it). Nevertheless, it is thought that the first filtering configuration may be particularly useful in areas, or at times, of low rainfall levels (e.g. in dry or desert areas, or during dry seasons), and hence there is increased importance on filtering (and capturing for storage) any water that is collected from the roof.

In FIGS. 7-19, the first part 240 and the second part 260 are attached to one another along their respective outer rim edges by way of an attachment mechanism (clips) 242. Each of the chamber parts 240 and 260 is also provided with an end wall. Also, as may already be evident from discussions above, each of the front end walls (i.e. on each of the first part 240 and the second part 260) comprises two semicircular cut-out or opening portions. The semicircular cutout openings in the first part 240 are labelled 248 and the semicircular cutout openings in the second part 260 are labelled 268. When the two chamber parts 240 and 260 are attached to one another, the cutout openings 248 in the first part 240 align with respective cutout openings 268 in the second part 260, to thereby form the chamber inlet 210 and the chamber outlet 220.

Whilst descriptions have been provided above of a filtering chamber 200 that is formed from two parts, namely a first part 240 incorporating an unperforated "river" portion 246 and a second part 260 that is essentially perforated all over, and whilst descriptions have been given for the way this can allow the filtering chamber 200 to be installed and used in different filtering configurations (specifically a first filtering configuration and a second filtering configuration as discussed above, each with potential benefits), nevertheless it is to be clearly understood that this may not necessarily always be the case in all embodiments of the invention. Indeed, other embodiments of the invention may be possible where, for example, the filtering chamber 200 is again formed from two "half shell" parts that are brought together to form the overall chamber, but where both of those parts are essentially the same (or mirror images of one another). For instance, both parts might resemble the first part 240 above, or both parts may resemble the second part 260 above. Or, indeed, both parts may have a configuration that differs somewhat from the first and second part (240 and 260) discussed above. In any event, in such cases, the resulting filtering chamber could sometimes still be installed in the housing of the apparatus 10 with one side, or the other, oriented down, but in these embodiments this will not affect the operation of the filter (i.e. the filter will operate in the same way regardless of which way the filtering chamber is installed within the housing because both sides of the filtering chamber are the same). An advantage that may be provided by these embodiments, namely where the filtering chamber effectively operates in the same way regardless of which way it is installed in the housing, is that a range of differently configured filtering chambers may be made available, and the user may therefore be able to select the filtering chamber whose configuration most closely suits their needs in the intended installation location, environment, application, etc.

Figure 4:
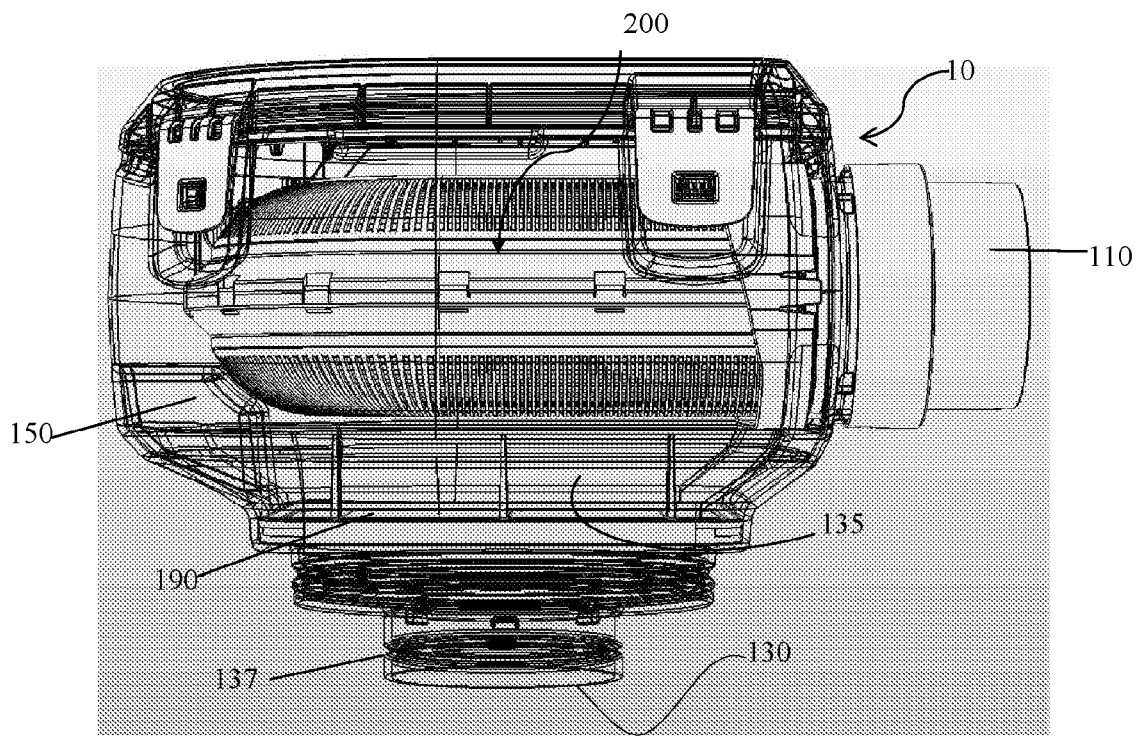
FIG. 4 is a side view of the filtering apparatus in accordance with the first embodiment, and in FIG. 4 some parts of the apparatus are represented transparently to reveal other parts that would otherwise be hidden from view.
Figure 5:
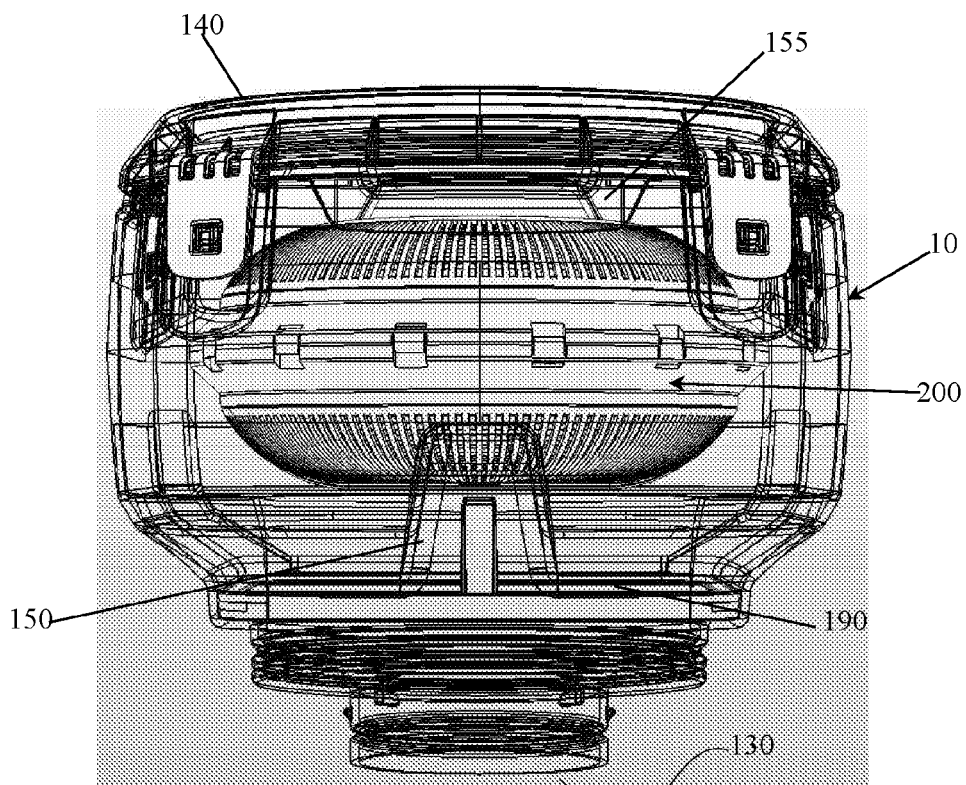
FIG. 5 is a rear-end view of the filtering apparatus in accordance with the first embodiment, and in FIG. 5 some parts of the apparatus are again represented transparently to reveal other parts that would otherwise be hidden from view.
Figure 6:
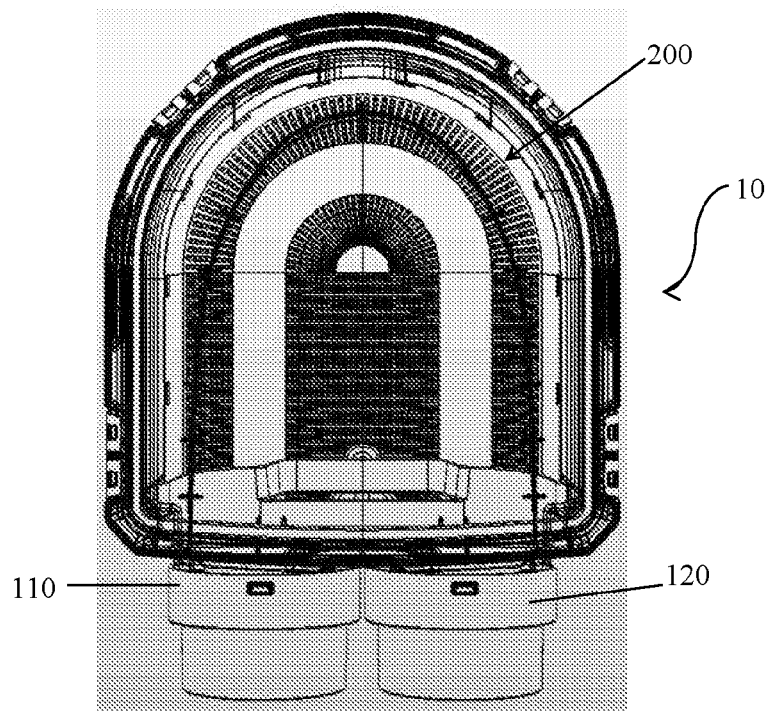
FIG. 6 is a top-end view of the filtering apparatus in accordance with the first embodiment, and in FIG. 6 some parts of the apparatus are again represented transparently to reveal other parts that would otherwise be hidden from view.

Referring again to the embodiment in FIGS. 1-6, it will be seen that the housing 100 is also provided with a supporting mechanism to support the filtering chamber 200 when the filtering chamber 200 is positioned within the housing 100. Referring to FIGS. 4 and 5 in particular, the housing is provided with a support in the form of a projection 150 that is positioned to support the curved end (i.e. the rear end portion that forms the curve in the chamber's overall U shaped) 225 of the filtering chamber 200. The projection 150 supports the rear end 225 of the chamber and prevents rearward movement of the filtering chamber 200 that might otherwise occur due the force or momentum associated with to rapid flow or high flow rates of water entering through the filtering chamber inlet 210 during use. Providing the projection 150 is also particularly advantageous because at the time of removing the filter chamber 200 (for cleaning, disassembling etc.), the projection supports the U shaped end of the filter (i.e. it stops the filtering chamber 200 sliding rearward in the housing) whilst a user lifts the filtering chamber 200 up and out of the housing 100 using the handle 252. In addition to projection 150, an arcuate flange (or ridge) 155 is provided on an underside of the lid 140. The arcuate flange 155 extends inwardly in a direction towards the filtering chamber 200 (when assembled) and has a curvature that is substantially similar to the outer curvature of the U shaped portion 225 of the filtering chamber 200. Upon assembly, the flange 155 engages the U shaped portion 225 and further prevents the movement of the filtering chamber 200 during use.

The filtering chamber 200 is provided with a handle 252. In the embodiment shown, the handle 252 is actually provided on a separate mounting ring component that is mounted or attached on/to an outer surface of the filtering chamber 200, on the front end thereof, and sized to snap onto the front end of the filtering chamber 200. The mounting ring 250 is also provided with a fastening mechanism 254 in the form of clips for clipping the mounting ring 250 onto the filtering chamber 200.

Referring to FIGS. 7, 8, 15, 16, 17, 18 and 19 in particular, it will be seen that on each of the chamber parts 240 and 260, on the respective insides thereof, there is a series of low profile flow directing ribs (these might also be referred to as flow directing ridges). On both parts 240 and 260, the low profile flow directing ridges extend along on the inside of the outer side edge walls, and there are also low profile flow directing ridges located on the inside of the central portion (except that on the first part 240 there are no such flow directing ridges on the river portion 246). On both parts, the ridges create a series of small flow directing channels (i.e. with a small channel formed between any two adjacent flow directing ribs), and because each ridge extends in an overall U shape beginning at (or near) the chamber inlet 210 and extending into the chamber before curving 180° to return and terminate at (or near) the chamber outlet 220, and because the flow directing ridges are all (or mostly) parallel and concentric with one another, it follows that the small flow directing channels formed between adjacent ridges all also extend in the same overall U shape. That is, each small flow channel (formed between a pair of adjacent flow-directing ridges) begins at (or near) the chamber inlet 210 and extends into the chamber before curving 180° to return and terminate at (or near) the chamber outlet 220, and because the ridges that define the respective channels are all (or mostly) parallel and concentric with each other, it follows that the respective channels are also parallel and concentric. One of the purposes of these flow directing ridges, and of the channels defined between them, is to assist with and promote the flow of water, and particularly debris borne by such flow, along the walls and sides of the filtering chamber 200, although the fact that the ridges have a low profile (and consequently so do the channels they define) means that whilst the channels help to assist the flow of debris, etc, along the walls and sides, they do not significantly block or interfere with water flows occurring away from the walls/sides within the volume of the filtering chamber 200. The flow directing ribs consequently help to assist with, in particular (although this is not necessarily their exclusive function), the expulsion of debris that is collected on the walls of the filtering chamber 200.

Figure 20:
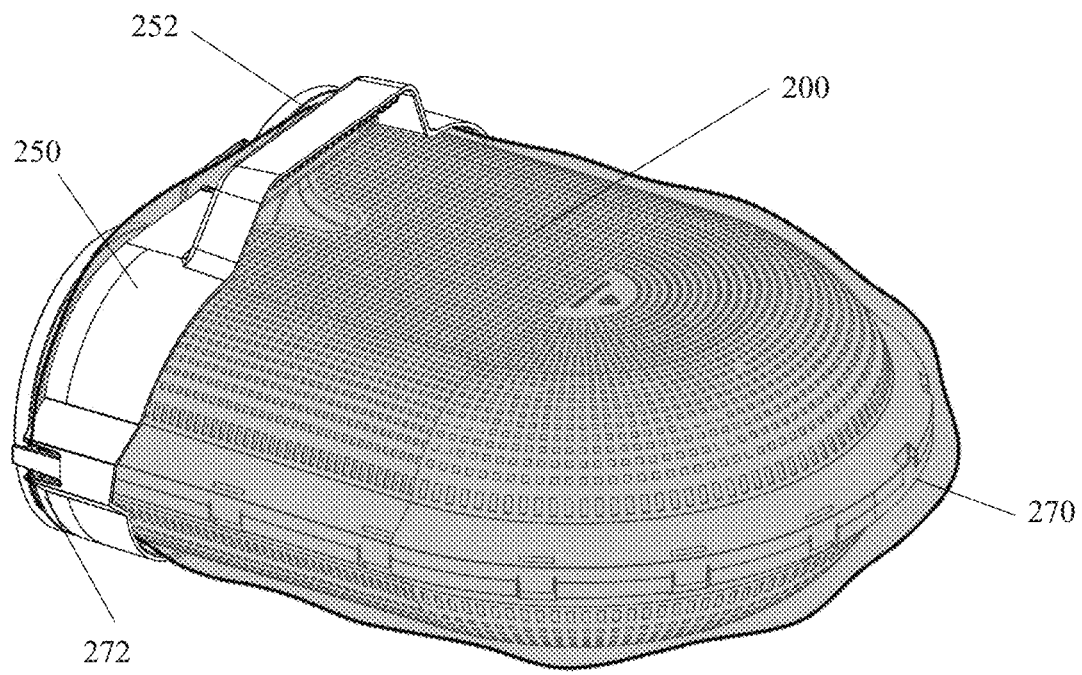
FIG. 20 is an image, the intended focus of which is the filtering chamber, which is being held by hand in the image—this is the filtering chamber corresponding to a prototype of the first embodiment, and the filtering chamber is shown contained within a supplementary flexible jacket filter.
Figure 21:
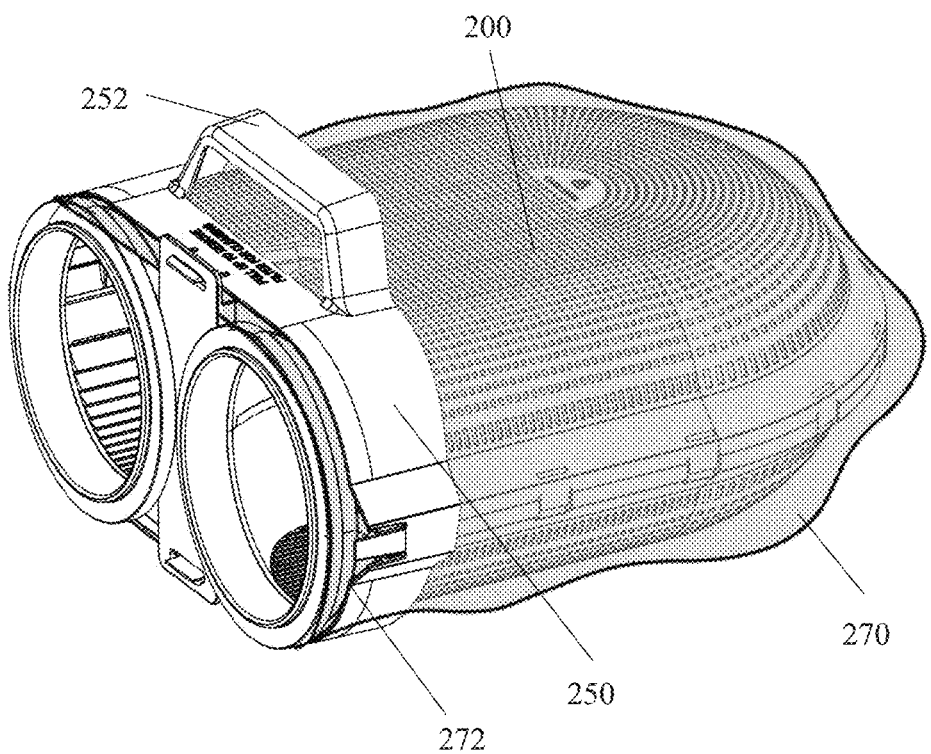
FIG. 21 is a second image, similar to FIG. 20, showing (in particular) the flexible jacket filter (which contains the filtering chamber) being grasped between the fingers thereby illustrating the jacket filter's flexible/fabric nature.

Referring to FIGS. 20 and 21, in a possible addition to the embodiment(s) discussed above, the apparatus 10 may further include a flexible jacket filter in the form of a porous filter bag 270. The filter bag 270 is sized to receive and enclose/envelop the filtering chamber 200 inside the filter bag, and it acts as an additional jacket filter for further filtering the already filtered water that passes (or has already passed) through perforations of the walls (filter screens) of the filtering chamber 200. The material used for the filter bag 270 may be selected on the basis of the pore size of the material, or filter bags 270 may be provided with a range of different pore sizes and a selection made of which bag (pore size) to use according to the filtering needs of a particular application. For example, if the perforations in the filtering chamber 200 are sized at 4 mm (typically for filtering large size debris such as twigs, leaves etc.) selecting a filter bag with a pore size of less than 2 mm, say, would be very helpful in preventing retention of contaminants that have a size smaller than 4 mm (and which may therefore pass through the perforations in the filtering chamber) but greater than 2 mm (such as mosquitoes). The filter bag 270 is also provided with a fastening mechanism 272 for fastening the filter bag to the filtering chamber 200 and preventing the bag 270 from being detached from the filtering chamber 200. As already alluded to above, the pore size of the filter bag may be increased or decreased in accordance with the requirements of the filtration operation.

Figure 22:
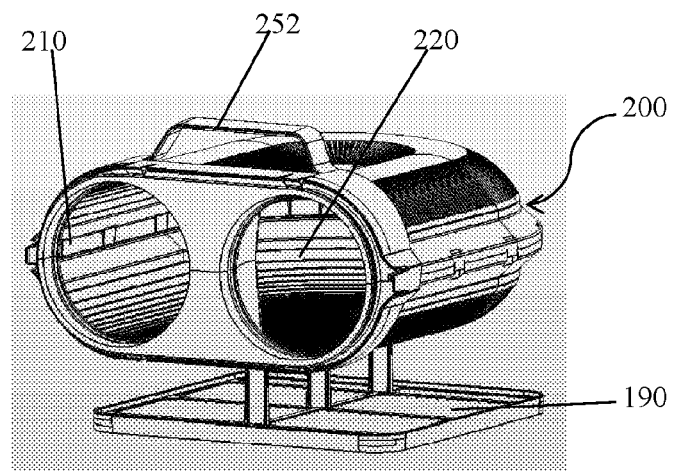
FIG. 22 is a perspective view of the filtering chamber, and also a secondary filtering screen which may also be used in the first embodiment.
Figure 23:
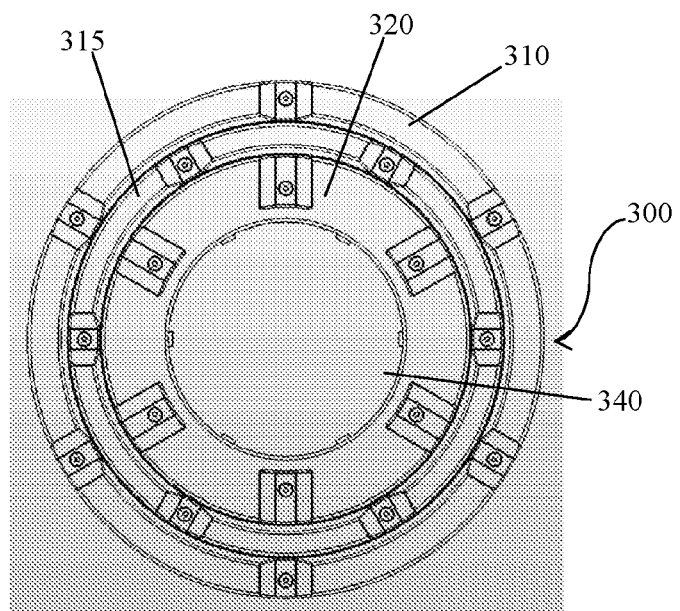
FIG. 23 is a top view of a tank connector (for connecting the apparatus to a tank such as a water tank).
Figure 24:
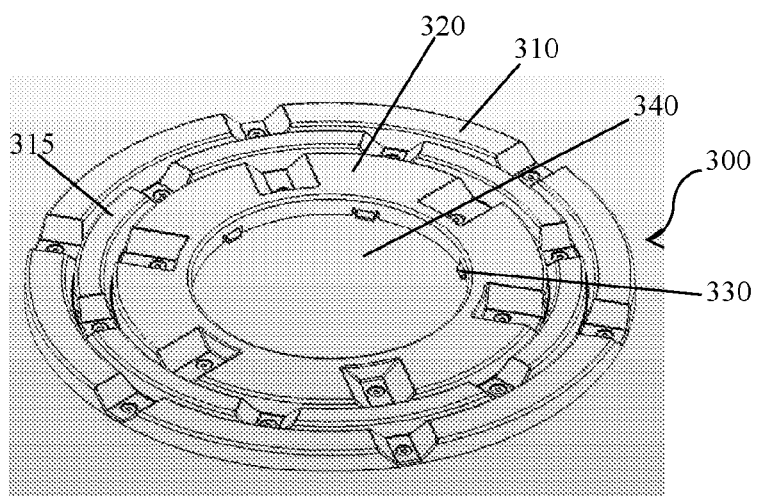
FIG. 24 is a perspective view of the tank connector in FIG. 23.

Referring now to FIG. 22, this Figure illustrates a slight variant on (or addition to) the filtering chamber 200 discussed above, wherein there is also an associated secondary filtering screen 190 and an accompanying supporting structure therefore. Note that, whilst it may not be apparent from FIG. 22, the filtering chamber 200, and the supporting structure associated with secondary filtering screen 190, are not integral with one another and can be separated. Having said this, the filtering chamber 200, and the secondary filtering screen 190 (and it structure) can both be inserted at the same time into, and used together within, the housing 100 of the apparatus 10. In fact, when this is done (as it is in FIGS. 1-6), the secondary filtering screen 190 (and it's structure) are inserted first, and thereafter the filtering chamber depicted can be inserted into the housing 100 in the same way as discussed above, and when this is done this causes the filtering chamber 200 to be positioned above (in fact it sits on, and is additionally supported on the top of, the three upstanding support posts extending from the support structure of the secondary filtering screen 190). Thus, the secondary filtering screen 190 becomes positioned below the filtering chamber 200 within the housing 100, such that the secondary filtering screen 190 functions to further filter the water (i.e. the water that has already been filtered by passing through the perforations in the filtering chamber) before the water finally passes to the filtered water outlet 130 and out of the apparatus. As can be seen in FIG. 22, the secondary filtering screen 190 is supported within a generally rectangular/square shaped frame—actually the rectangular/square frame supports a mesh-like screen which forms (and functions as) the secondary filtering screen 190. An advantage of the filtering screen 190, when used in the apparatus 10 as in FIGS. 1-6, is that during use, temporary removal of the filtering chamber 200 may be necessary for cleaning of the filtering chamber 200 etc. In such a scenario, the filtering screen 190 can remain in place, and if so it provides at least one filtration stage for any water entering or flowing through the housing 100 while the filtering chamber 200 is removed. The secondary filtering screen 190 (which may also be referred to as a base filter) can therefore assist in, for example, keeping debris out of a rain water tank connected to the apparatus 10 during periods of maintenance when the filtering chamber 200 is removed for cleaning, servicing etc. The screen 190 may also help to prevent any maintenance tools, which may be inadvertently dropped into the inside of the filter housing 100, from falling into the rain water tank during repair, cleaning or maintenance of the filtering chamber 200. A skilled person would readily appreciate that the overall outline or shape of the filtering screen 190 is not necessarily limited to the square shaped configuration depicted in FIG. 22. In further embodiments, the filtering screen may be provided in a circular configuration as a circular filtering screen 191 as shown in FIG. 41 without departing from the spirit or scope of the embodiments of the invention described herein.

In yet further possible embodiments, the filtering screen 190 may be removed and replaced by, or alternatively it may be further supplemented by the addition of, a water processing or filtering or treatment module (not illustrated) which is itself positioned to receive and further treat any water filtered by (and exiting) the filtering chamber 200 within the housing, such that at least a part of and preferably all of the water filtered by the filtering chamber 200 is processed or treated by the said module. This processing/filtering/treatment module may be provided in the form of a ceramic filtering block or metallic foam such as Silver foam. Provision of such a module assists in further treatment and/or filtration of the water filtered by the filtering chamber. By way of example, treatment of the filtered water with a module comprising Silver foam may provide an anti-bacterial treatment to the filtered water. Such a module (if present) should be readily accessible by the user for replacement or maintenance.

Referring to FIGS. 1 to 3 and FIGS. 23 to 24, the filtering apparatus 10 further comprises a tank connector 300 for connecting and securing the housing 100 onto an opening of a tank such as a rain water tank (not shown) such that filtered water released from outlet 130 is directed (i.e. it flows directly) into the tank through an opening in the tank. Rain water tanks are available in various different (often standard) sizes and consequently the (generally circular) inlet openings in the top of such tanks also often vary in size, but tend to correspond to certain standard opening sizes. The connector 300 is configured for fitting the housing 100 onto circular tank openings of different set (or standard) sizes. The connector 300 comprises an inner circular aperture 340 that is sized for receiving the outlet 130 from the housing. Mounting clips 330 are provided around the circumference of the aperture 340 to engage the outer collar 137 of the housing to thereby fasten the housing 100 to the connector 300. The connector 300 consists of concentric mounting rings 310, 315 and 320 which are inter-connected to one another, at least initially. Each of the mounting rings (310, 315, 320) is sized to be attached to a correspondingly standard sized circular opening in a tank. Thus, for example, for a smaller opening in a rain water tank, mounting rings 310 and 315 can be removed from the outside of the smallest mounting ring 320, such that mounting ring 320 (the only remaining mounting ring, with the housing 100 connected thereto) may then be used for securing the filtering apparatus 10 onto that smaller tank opening. Or, if the apparatus is to be mounted to a tank with a slightly larger tank opening, the largest mounting ring 310 may be removed from the outside of the middle (medium) mounting ring 315, such that the mounting ring 315 is used for securing the filtering apparatus 10 to the tank opening. And similarly, if a rain water tank has a large opening, mounting ring 310 (having a greater diameter than mounting rings 320 and 315) may be used (i.e. there is no need for removal of any of the rings if outermost/largest mounting ring 310 is itself to be used to connect to the tank). Therefore, the connector 300 advantageously allows the housing 100 to be used in conjunction with, and connected to, rain water tanks having openings of different sizes (diameters) without the need for purchasing additional coupling arrangements.

Figure 25:
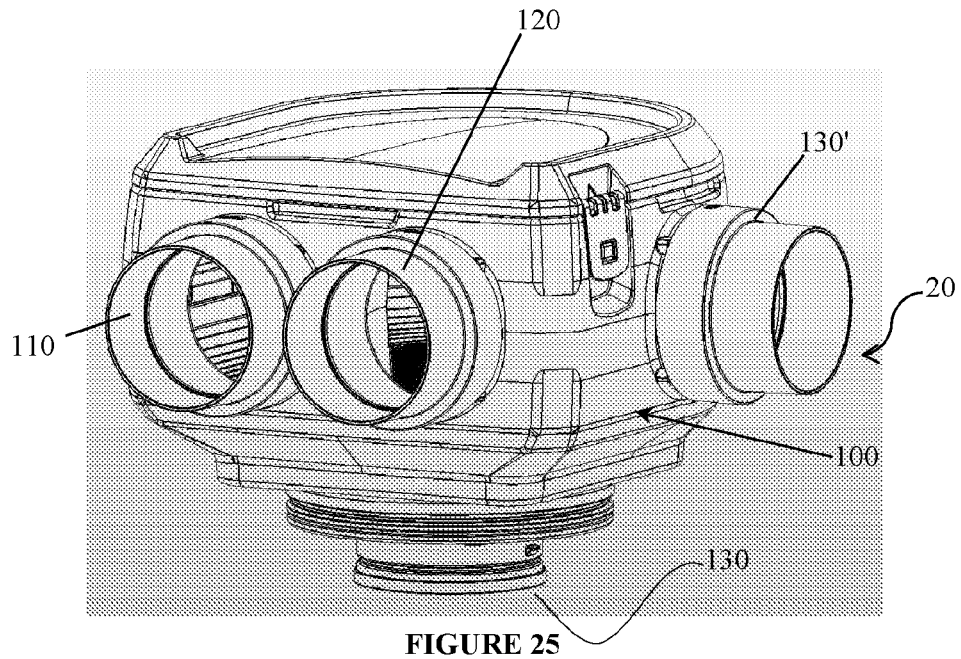
FIG. 25 is a first perspective view of a filtering apparatus in accordance with a second embodiment of the present invention.
Figure 26:
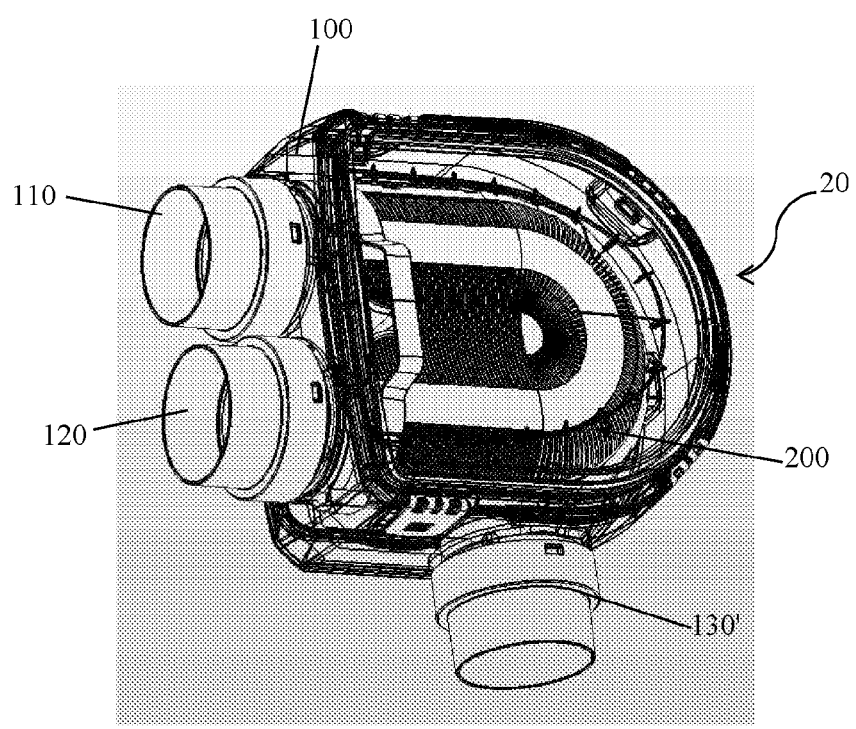
FIG. 26 is a second perspective view of the filtering apparatus in accordance with the second embodiment, wherein some parts of the apparatus are represented transparently to reveal other parts that would otherwise be hidden from view.

Referring to FIGS. 25 and 26, these Figures depict an alternative embodiment 20 of the filtering apparatus which has more than one outlet for expelling filtered water from the housing 100 (i.e. it has more than one "filtered water" outlet). In FIGS. 25 and 26, similar reference numerals represent similar features to those discussed for previous embodiments. The housing 100 is provided with a first filtered water outlet 130 and an additional filtered water outlet 130'. The additional filtered water outlet 130' is provided on a side wall of the housing 100. Advantageously either of the outlets 130 or 130' may be selectively used as the only "filtered water" outlet from the housing 100, or the outlets 130 or 130' may be used in combination (i.e. both can function as outlets at the same time). One of the key advantages afforded by providing multiple outlets from the housing is that the filtering apparatus 10 may, if desired, be installed in a non-horizontal configuration (as shown in FIG. 26) in which the inlet 110 is located substantially (or at least somewhat) vertically above the outlet 120. In this kind of non-horizontal installation configuration, the filtering apparatus 20 may requires less space (or at least less space in a horizontal direction/plane) as compared to in the horizontal installation configuration discussed with reference to the embodiment 10 above, and this may prove useful where there is a need to install the apparatus in more confined spaces.

In these non-horizontal installation configurations, even if the filtering chamber 200 is provided with the two different parts/sides (as discussed above and shown in FIGS. 7-19) and is therefore capable of installation in one filtering configuration/orientation relative to the housing 100, or alternatively in a second different filtering configuration/orientation relative to the housing 100, nevertheless because the overall apparatus 10 is not installed horizontally the particular flow functionalities (and associated benefits) achievable in those different filtering configurations/orientations may not be the same in the non-horizontal overall installation configurations. Nevertheless, a number of the other functions, and performance benefits of the present invention may still apply in these non-horizontal installation configurations.

Figure 27:
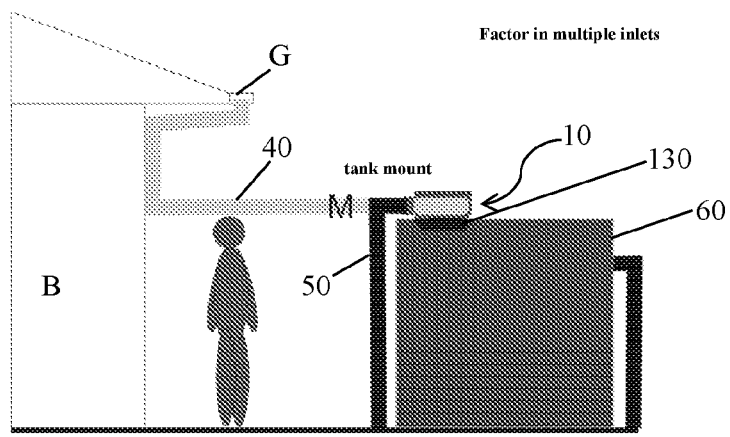
FIG. 27 is a schematic illustration of a "tank-mounted" installation of a filtering apparatus in accordance with the present invention.
Figure 28:
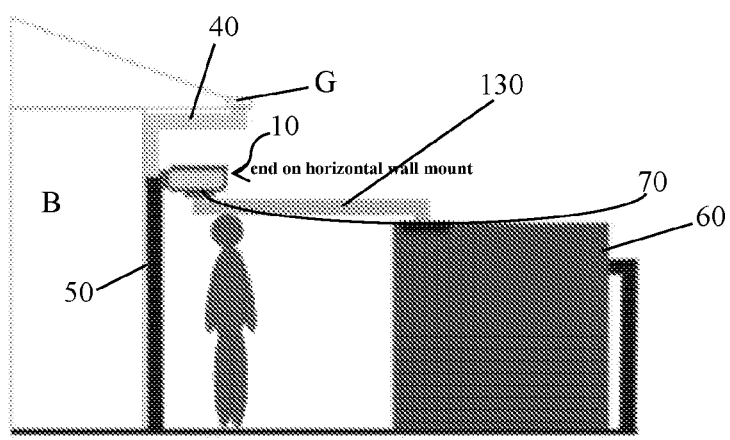
FIG. 28 is a schematic illustration of a first (end-on horizontal) wall-mounted installation of a filtering apparatus in accordance with the present invention.
Figure 29:
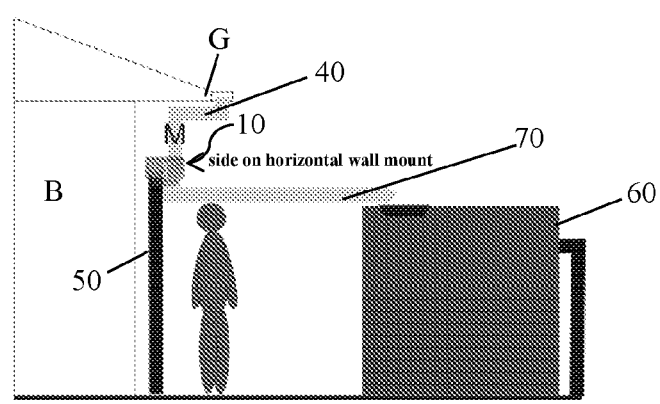
FIG. 29 is a schematic illustration of a second (side-on horizontal) wall-mounted installation of a filtering apparatus in accordance with the present invention.
Figure 30:
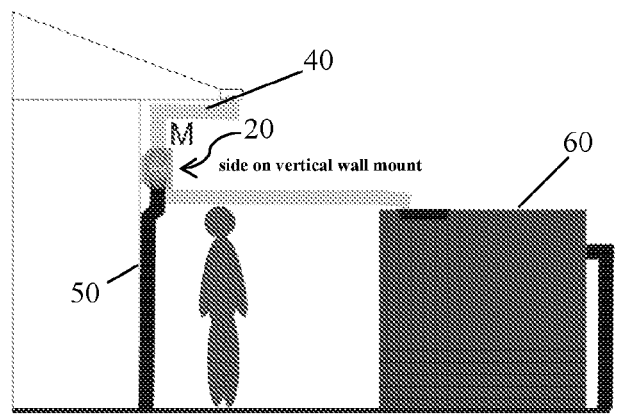
FIG. 30 is a schematic illustration of a third (side on vertical) wall-mounted installation of a filtering apparatus in accordance with the present invention.
Figure 31:
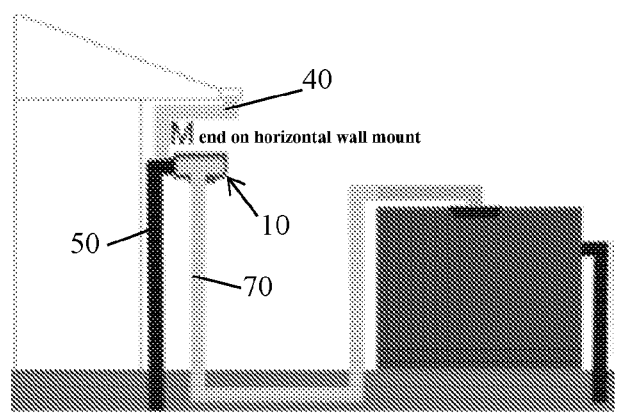
FIG. 31 is a schematic illustration of a fourth (end-on horizontal) wall-mounted installation of a filtering apparatus in accordance with the present invention.
Figure 32:
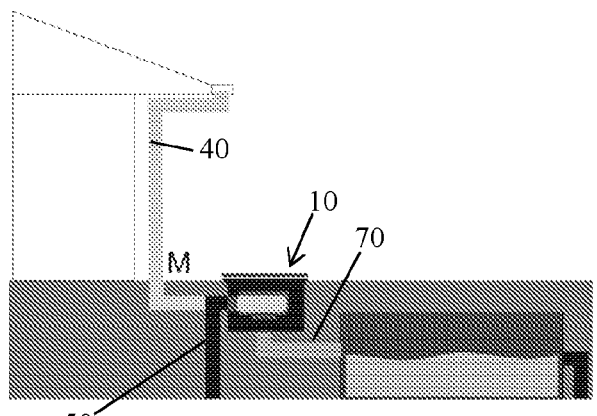
FIG. 32 is a schematic illustration of an in-ground installation of a filtering apparatus in accordance with the present invention.
Figure 33:
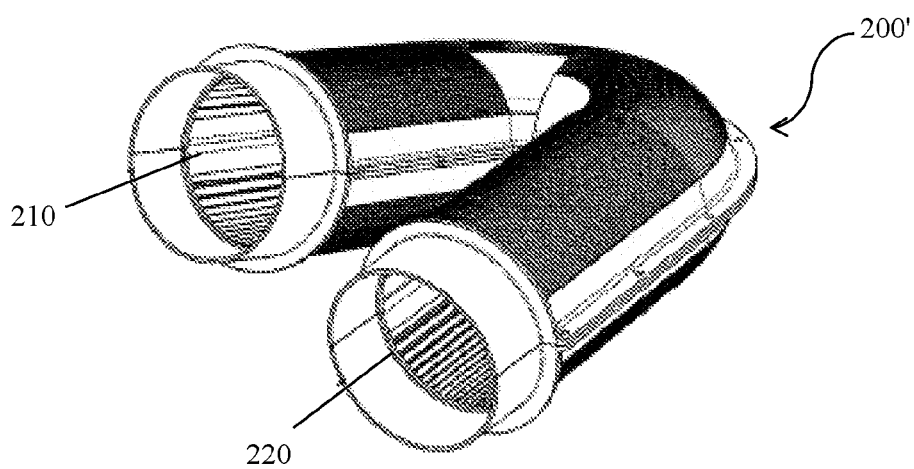
FIG. 33 is a perspective view of a second (variant) embodiment of the filtering chamber.
Figure 34:
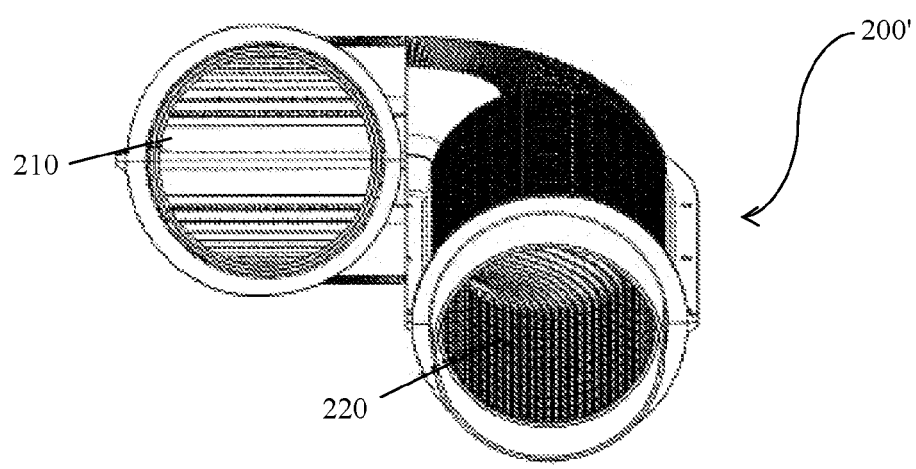
FIG. 34 is a front end view of the second (variant) embodiment of the filtering chamber.
Figure 35:
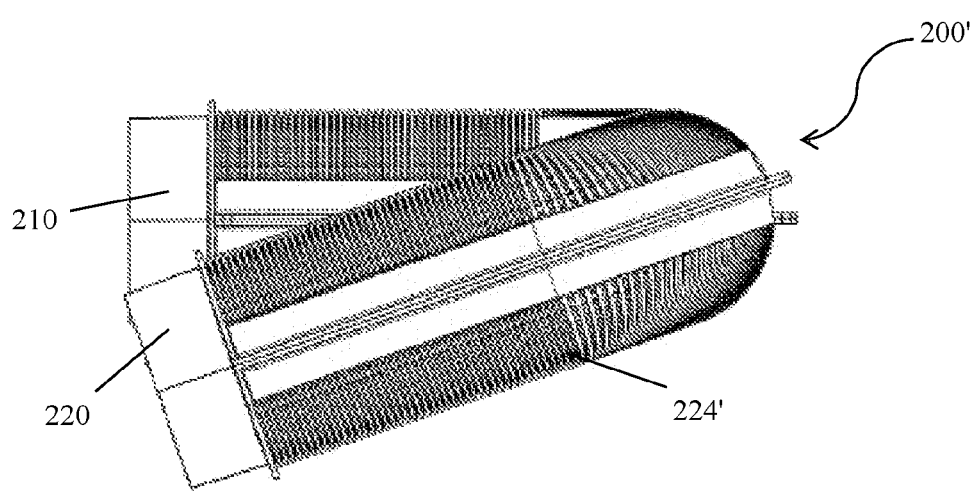
FIG. 35 is a first side-view of the second (variant) embodiment of the filtering chamber.
Figure 36:
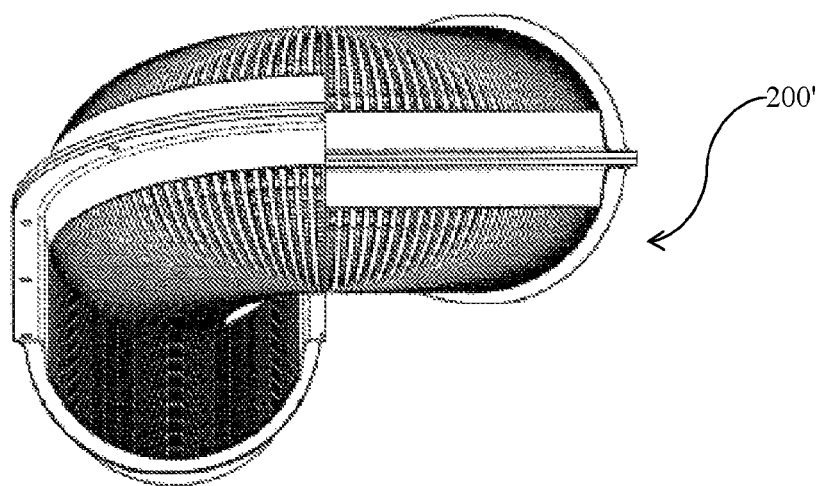
FIG. 36 is a rear-end view of the second (variant) embodiment of the filtering chamber.
Figure 37:
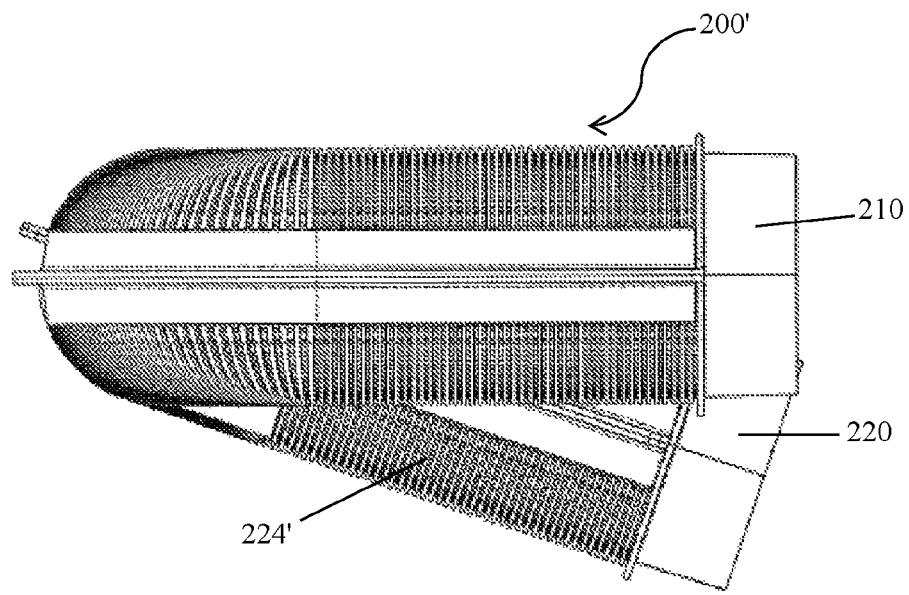
FIG. 37 is a second side view of the second (variant) embodiment of the filtering chamber.

FIGS. 27 to 32 illustrate various different configurations in which (i.e. positions/locations where) the filtering apparatus in accordance with previously discussed embodiments can be installed. Reference numerals in these Figures indicate features discussed previously with reference to like reference numerals. In a typical installation, a supply line/pipe (e.g. downpipe) 40 leading from a roof gutter G associated with a building B, and which therefore conveys a flow of contaminated rain water (including debris such as leaves, twigs, dirt etc.) may be connected to inlet connecting conduit 110 on the apparatus (10 or 20) to allow passage of the contaminated water into the filtering chamber 200. The filtering apparatus (10 or 20) may be positioned by mounting the apparatus onto an opening in (i.e. directly in the top of) the rain water tank 60 (FIG. 27). In such a configuration the filtered rain water is expelled directly into the rain water tank 60 and any unfiltered water expelled from outlet 220 is directed via drainage line 50 into a storm water drain. In alternative configurations, the filtering apparatus (10 or 20) may be positioned adjacent the building B or the guttering system G (FIGS. 28 to 31). In such configurations, the filtered water outlet(s) 130 (and/or 130') is/are connected to the rain water tank by clean water line 70. A skilled person would readily appreciate that the scope of the present invention is in no way limited by the configuration in which the apparatus is installed.

FIGS. 33 to 37 illustrate an alternative form/configuration of filtering chamber 200'. As above, reference numerals in these Figures indicate features discussed previously with reference to like reference numerals. As FIGS. 33 to 37 illustrate, the filtering chamber 200' in this alternative form/configuration is, in fact, a generally U-shaped tube (with perforated walls), except that one of the "legs" of the U-shaped is angled/sloped relative to the other. Filtering chamber 200' again allows the flow of water in through inlet 210 into the filtering chamber 200' and out through the outlet 220 (and of course water can also be filtered through the perforations in the walls). Unlike the previously described filtering chamber 200, however, in the filtering chamber 200' the inlet 210 and the outlet 220 do not lie in the same plane. Instead, the inlet 210 is oriented so that it will generally be positioned at an elevated position relative to (i.e. it will generally be higher than) the outlet 220. The circular-cross-section opening/passageway connecting the inlet 210 to the 220 allows influent water to flow from the inlet 210 along and to the outlet 220, including with the assistance of gravity. As will be appreciated from the illustrations in FIGS. 33 to 37, water which is entering at the inlet 210 or still within "inlet leg" will naturally be at an elevated position and will consequently possess a relatively higher potential energy than water that is within the "outlet leg" or nearing the outlet 220. As a result, the water with a higher potential energy (e.g. within the "inlet leg") will have a natural tendency to fall under gravity, and in addition to assisting to promote passage of the water through the perforations, this may also assist with promoting flow of any unfiltered water through the passageway of the filtering chamber 200', especially around into the "outlet leg" and through outlet 220 (carrying with it any in train contaminants). The filtering chamber 200' is therefore similar to the filtering chamber 200 in that the passageway is provided with perforations which allow water to filter therethrough and trap any contaminants which are equal to or bigger than the size of the perforations. Any unfiltered water that does not pass through the perforated walls of the filter 200' also will continue to flow along the passageway formed by the walls of the filtering chamber 200', and then flow out through outlet 220. Rubbish and debris etc. (which naturally cannot pass through the filtering screen/perforations) may be carried out through the outlet 220. A difference with the filtering chamber 200' (compared to filtering chamber 200) is that part of the passageway, specifically the sloped portion 224', is sloped in a downward direction to assist with the flow of water out of the filtering chamber and removal of trapped contaminants that may be accumulating on inner walls of the filtering chamber 200'.

Figure 39:
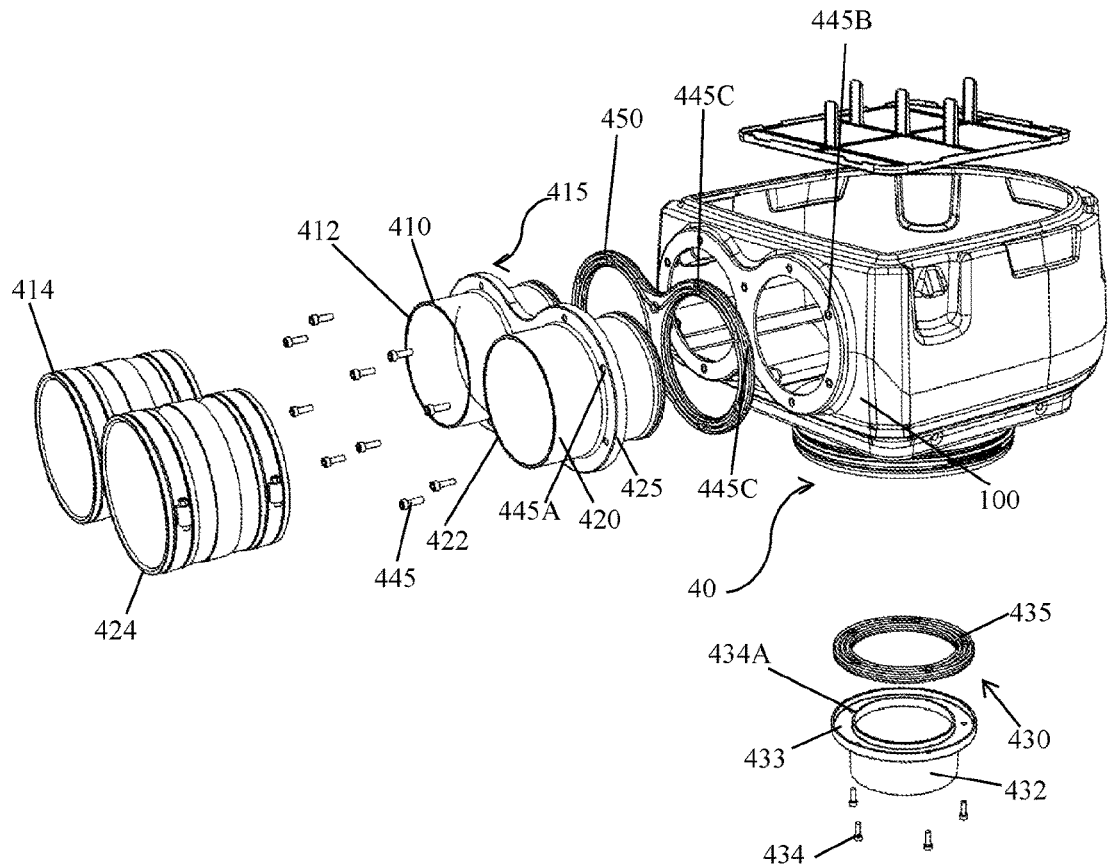
FIG. 39 is an exploded perspective view of a filtering apparatus in accordance with a third embodiment of the present invention (note that the filtering chamber that may be used in this embodiment is omitted from FIG. 39).

Referring to FIG. 39, a further filtering apparatus embodiment 40 is illustrated. As above, similar reference numerals represent similar features to those discussed for previous embodiments. FIG. 39 does not actually show the filtering chamber used in this embodiment; however this may be similar to the filtering chamber 200 above. Therefore, the filtering chamber inlet 210 and outlet 220 are positioned during use to be connected with the connecting assembly 415. The connecting assembly comprises connecting conduits 410 and 420 and is preferably injection moulded in the form of a one-piece assembly. The connecting assembly 415 is fastened or attached to the housing 100 during use. In order to be fastened or attached, the connecting assembly 415 is provided with a connecting flange 425. The connecting flange 425 extends along a peripheral outer wall portion of each of the connecting conduits 410 and 420. The connecting assembly 415 is positioned in a manner such that the connecting conduits 410 and 420 function as connectors for connecting the filter inlet 210 and outlet 220 with a source for the contaminated water, and a drain for the unfiltered water, respectively; via pipes or the like. The connecting assembly 415 is attached to the housing 100 by way of fasteners 445 passing through corresponding apertures 445A provided along the flange 425 and apertures 445B provided along the body of the housing 100. A resilient sealing gasket 450 is also provided to provide a resilient and leak-proof (seal) connection in between the connecting assembly 415 and the housing 100. The gasket 450 is also provided with apertures 445C that are adapted to receive fasteners 445 for performing the connecting and sealing function as described above. The connecting conduits 410 and 420 may be further coupled to pipework (such as PVC pipes) at their respective free ends 412 and 422 by resilient coupling devices such as rubber clamps 414 and 424.

The filtering apparatus 40 is also provided with an outlet connector assembly 430 for being connected to the second outlet. The connector assembly 430 comprises a connecting conduit 432 with a flanged connector 433. The connector assembly 430 is connected to the housing 100 by fastening the assembly 430 onto the housing 100 using fasteners 434. The flanged connector 433 is provided with corresponding fastener receiving apertures 434A. The assembly 430 may be fastened to the housing 100 by positioning a resilient sealing gasket 435 which is positioned in between the flanged connector 433 and the housing thereby assisting in providing a leak proof seal.

Referring to FIGS. 40 to 42, yet another embodiment of the present invention in form of filtering apparatus 50 is illustrated. As above, similar reference numerals represent similar features to those discussed for previous embodiments. Unlike the embodiment illustrated in FIG. 39, in the embodiment illustrated in FIG. 40 a connecting assembly 415 is not used for connecting the filtering chamber inlet 210 and outlet 220 with pipework (inlet and outlet) and 41. Instead, the housing 100 is provided with connecting conduits 110 and 120 that extend outwardly relative to an outer wall of the housing 100 and assist in connecting the filter inlet 210 and outlet 220 with pipework. Sealing gaskets 211 and 221 are provided such that the inner circular wall portion of each of the connecting conduit 110 and 120 receives and contacts the gaskets 211 and 221, and the gaskets also engage with and seal against the filtering chamber inlet 210 and filter outlet 220. During use, the gaskets 211 and 221 are pressed in between the inner surface of the connecting conduits 110 and 120 (inside the housing 100) and the peripheral portion of the filter inlet 210 and the filter outlet 220 respectively.

During use, the connecting conduits 110 and 120 may be coupled with pipework such as PVC pipework using rubber clamps 414 and 424. Similarly the connecting conduit functioning as an outlet 130 for the filtered water exiting the filtering chamber may also adapted to be coupled to PVC pipework using rubber clamp 425. The coupling of the rubber clamps 414, 424 and 425 with connecting conduits 110, 120 and 130 respectively provides a substantially leakage-proof seal.

Generally, in all of the various embodiments discussed above, the various parts of the filtering apparatus may be made from any suitable material (and different parts may be made from different materials). It is expected that, usually, most parts of the solid or structural parts apparatus will be made from a polymer or plastic material, typically injection moulded plastic. However, no limitation whatsoever is to be implied from this. Also, some parts such as gaskets, seals, etc, may be made from other more resilient materials such as rubber. In relation to the filtering chamber (including in the various different possible embodiments 200, 200', etc, discussed above), this (or some or certain parts of it) also may be (and it is thought it often will be) made from injected moulded plastic. However, the filtering chamber (or even just some or certain parts of it) could also be made in other ways and/or from other materials; for example it (or parts of it) could be made from steel or other metal mesh, and if so, it/these could be made in numerous ways, such as by being woven together, welded together, or expanded. In the case where the filtering chamber (or portions of it) are made from expanded metal or expanded metal mesh, it will be understood that such expanded metal meshes are typically directional in that the openings or perforations in the mesh formed through expansion tend to tilt or slope more in one-way than the other, and this may be used (i.e. the orientation of the perforations may be arranged) for example to encourage higher water yield, or greater cleaning efficiency, as desired.

Additionally, one or more further parts (not illustrated) may be provided (possibly for insertion into the inside of the filtering chamber) for closing off holes or perforations in certain parts of the filtering chamber in order to thereby help to promote or maintain higher velocity or flowrate of unfiltered water flowing through the chamber, by reducing the amount of water that is able to filter through the filtering chamber. This would improve self-cleaning but at the expense of catchment efficiency. Alternatively, the design of the filtering chamber itself could be modified, specifically to incorporate smaller or fewer perforated areas (or more areas that are un-perforated), for similar reasons.

As mentioned above in connection with the embodiment of the apparatus 10 in FIGS. 1-6, the lid 140 thereof is secured to the base portion 170 of the housing 100 using clips 180. In a possible alternative embodiment/version, the overall shape of the base portion 170 of the housing could be more round, and in particular the opening in the top thereof that is closed/covered by the lid may be circular. In such cases the upper circular opening in the base which is closed/covered by the lid, and also the lid itself, may both be round and both provided with complimentary threads, such that the lid can be screwed onto the top of the base 170. In this case there would be no need for clips 180 or the like.

The way in which the apparatus in the various embodiments described are self-cleaning has been described in detail above. In some possible variants, in order to facilitate further cleaning (but without necessarily needing to remove the filter chamber from inside the housing) body of the housing 100 may be provided with e.g. a hosepipe connection so that a hosepipe can be connected directly to the housing in order to, in effect, "blast" pressurised water into the chamber two dislodge debris that may be stuck or resident on the inside of the filter chamber and wash it out.

In the various embodiments described above and shown in the drawings, the configuration of the filtering chamber has been such that, if contaminated water flows into the filtering chamber and then continues to exit the filtering chamber unfiltered, in order to do so the flow direction of the water must in effect reverse (i.e. the flow must change direction by approximately 180°). However, the scope of the invention is not necessarily limited to this. Other embodiments of the invention may be possible where the amount that the direction of the flow of water changes as it flows unfiltered all way through the filtering chamber is less. As an example, embodiments may be provided in which any water that enters the filtering chamber and continues all the way through the filtering chamber unfiltered only changes flow direction by approximately 90°. In such cases, such a filtering chamber may have a general or approximately overall L-shape (or filtering chamber may define an overall L-shaped flow path therein). As a further alternative, embodiments might be provided in which the direction of flow of water remaining within the filtering chamber may be required to change multiple times between the filtering chamber inlet and the chamber's unfiltered water outlet, for example by providing a filter chamber the shape which requires any flow remaining therein to flow through an S-shaped curve or a flow path. As a yet further alternative, embodiments might be provided in which any water that enters the filtering chamber and which continues all the way through the filtering chamber unfiltered must flow uphill (or vertically upwards) for at least a portion of the flow path between the filtering chamber inlet and the chamber's unfiltered water outlet. A requirement for such an "uphill" (or vertically upwards) flow within the filtering chamber could be created by the configuration (i.e. shape) of the filtering chamber itself and/or by the orientation in which the filtering chamber (or indeed the overall filtering device) is installed.

An explanation is provided above of the way the concentric-ring-like tank connector 300 can be used to connect the apparatus directly to a tank. It is to be clearly understood that the apparatus might also be connected to the tank in other ways, including by connecting the "clean" water outlet from the apparatus directly to the tank without the need for a separate or intervening device.

Examples

Non-limiting examples, which are based on experiments and tests performed using embodiments as (or like those) described above, will be discussed below.

Water Loss

Catchment efficiency testing of the filtering apparatus 10 discussed previously was carried out in range of different operating configurations. As discussed in previous sections, the filtering chamber 200 may be operated in two possible operating configurations.

In the second operating configuration, the filtering chamber 200 is positioned so that the perforated wall section 245 with a raised or profiled central portion 247, which is separated by the unperforated "river" portion 246 from the peripheral perforated portion 249, forms a floor of the filtering chamber 200 during use. This operating configuration defines the "river filter" or the river filtering configuration. In the first operating configuration, the filtering 200 is positioned so that that flat wall portion 267 forms the in use floor of the filtering chamber 200 during use. This operating configuration defines the "flat filter" or the flat filtering configuration.

The filtering bag 270 with a pore size or a mesh size of approximately 180 μm was used as a jacket to enclose the filtering chamber 200 during all the tests reported in Table 1.

TABLE 1

| Flowrate (Lp/s) | Flat filter 180 Micron filter bag 100 mm outlet [% Water LOST] | River filter 180 Micron filter bag 100 mm outlet [% Water LOST] | Flat filter 180 Micron filter bag 225 mm outlet [% Water LOST] | River filter 180 Micron filter bag 225 mm outlet [% Water LOST] |
|---|---|---|---|---|
| 1 | 0 | 0 | 0 | 0 |
| 2 | 0 | 1.5 | 0 | 1 |
| 3 | 0 | 6.2 | 0 | 5 |
| 4 | 1.3 | 12.5 | 1.4 | 12 |
| 5 | 7 | 16 | 6.6 | 16.2 |
| 6 | 10.3 | 20.9 | 10 | 19.3 |
| 7 | 12.8 | 22 | 11.4 | 22.5 |
| 8 | 14 | 25.3 | 13.3 | 23 |
| 9 | 13.7 | 25.7 | 13.5 | 24.1 |
| 10 | 14.4 | 24.7 | 13.7 | 23 |

The results outlined above indicate the quantity of unfiltered water that exited from outlet 220 as a percentage of water that flowed into the filtering chamber 200 through inlet 210. Two sets of experiments were conducted in each operating mode. The second outlet 130 may be cut out at different portions along its length to provide an outlet size of either 110 mm or an outlet size of 225 mm. In the first set (as illustrated in Table 1), the outlet 130 was cut out to provide an outlet having a diameter of 110 mm (commonly known in the industry as "a 100 mm outlet"). In the second set, the outlet 130 was cut out to provide an outlet having a diameter of 225 mm (commonly known in the industry as "a 225 mm outlet"). The results illustrated in the table indicate that operation of the filtering chamber 200 in the river filter mode resulted in a higher loss of water and consequently reduced catchment efficiency of the filtering apparatus.

Mesh Size of Filtering Bag

Figure 38:
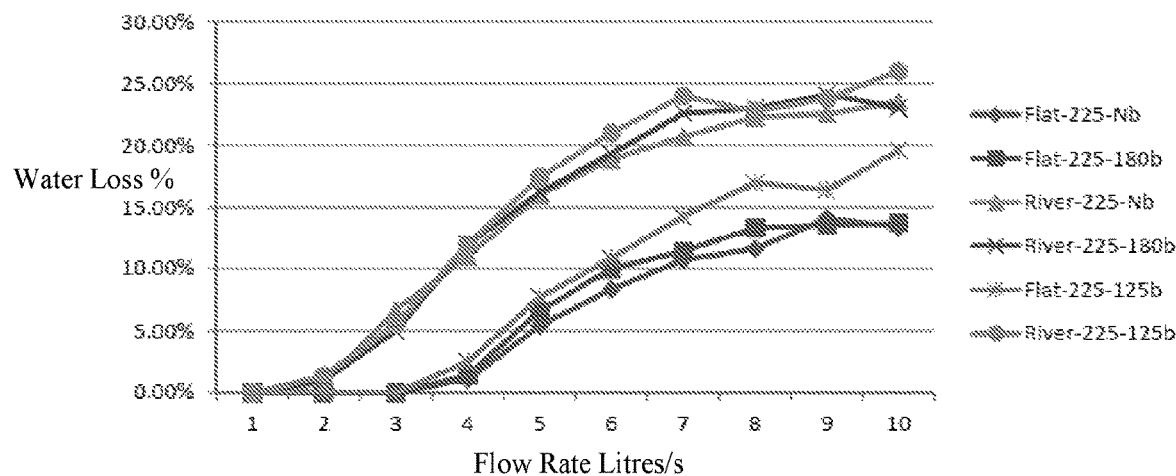
FIG. 38 is a graphical illustration of test results from the use of the first embodiment of the present invention with filtering bags of varying mesh sizes.

Operational efficacy of the filtering chamber 200 in the river mode and the flat mode were also carried out in accordance with the previously described tests to ascertain the effect of using filtering bags (jacket filters) 270 of varying mesh sizes in each mode, namely mesh sizes 180 μm and 125 μm. As a control, tests were also carried without enclosing the filtering chamber 200 (i.e. with no jacket filter) in the river mode and flat mode. FIG. 38 is graphical illustration of the test results from operation in the flat and river mode (denoted by "Flat" and "River"). Tests were carried out in each mode in conjunction with using a filtering bag of mesh size 180 μm (denoted as "180b"), mesh size 125 μm (denoted as "125b"). Tests in each operating mode were also carried without using a filtering bag (denoted by "Nb"). As evident from FIG. 38, operation in the river mode resulted in a higher percentage of water loss. Furthermore, the water losses were reported to be the least when no bags were used. The highest level of water loss was reported when the filtering bag of mesh size 125 μm was used in the river mode and the flat mode.

Debris Testing

The debris testing was carried out by positioning the filtering chamber 200 in the flat mode (Table 2) and in the river mode (Table 3).

Debris used for conducting this test included dead leaves, and tests were carried out under two main debris conditions. More specifically, a 'heavy debris' load storm simulation test and a 'medium debris' load storm simulation test was carried out for the filtering chamber 200 in each mode of operation. A storm simulation was used to simulate a real storm by starting with a low flow and debris, and slowly increasing the flow rate and debris load.

Heavy Debris Storm Test

During testing in the Heavy debris storm test, 6-7 cups (100 mm vent cowls) of debris was added over a span of about 8-10 minutes and then tests were commenced by allowing water to flow into the filtering chamber to test whether the debris could be dislodged from the internal space defined by the filtering chamber 200.

Medium Debris Storm Test

During testing in the Medium debris storm test 4 cups (100 mm vent cowl) of debris were added over a span of about 5 mins, and tests were commenced by allowing water to flow into the filtering chamber to test whether the debris could be dislodged from the internal space defined by the filtering chamber 200.

TABLE 2

Flat filter with 180 micron bag

| Storm sim type | Test | Comments | Result |
|---|---|---|---|
| Heavy debris load | 1 | UNSEEDED, Flow up to 6 L/s did not clear | 0% clear |
| | 2 | UNSEEDED, Cleared a little but caught most of the debris, even up to high flow of 9 L/s | 15% clear |
| | 3 | UNSEEDED, Performed well, cleared over 60% of the debris at 6 L/s. Down to 5 L/s, 3 L/s and up to 7L/s, 8L/s and more debris cleared. Probably 70% cleared in the end. | 70% clear |
| | 4 | UNSEEDED, Blocked up but began clearing at higher flows of 9 L/s, 10 L/s. Down to 7 L/s, 4 L/s, back up to 6 L/s, 8 L/s. | 70% clear |
| Medium debris load | 5 | UNSEEDED, Blocked up until about 6 L/s and started to clear majority. Up to 7 L/s, 8 L/s, 9 L/s, down to 4 L/s cleared a little more. | 65% clear |
| | 6 | UNSEEDED. Started clearing at 6 L/s again where majority cleared. Cycling up and down through flow rates cleared even more. | 90% clear |

TABLE 3

River filter with 180 micron bag

| Storm sim type | Test | Comments | Result |
|---|---|---|---|
| Heavy debris load | 1 | SEEDED - Did not clear, backed up. | 0% clear |
| | 2 | UNSEEDED - Didn't clear, backed up | 0% clear |
| | 3 | UNSEEDED - Backed up, Increased flow to 7-8 L/s where some debris came out, up to 10 L/s, down to 5 L/s for a while, up to 7 L/s where a good amount debris came out, down to 3 L/s, up to 7 L/s where the majority of the debris came out. Found that the outlet lip had some varying heights to the outlet, resulting in a bit of a 'catch'. Will fix this up. | 95% clear |
| | 4 | UNSEEDED - Fixed up the front lip of filter so leaves can't catch on it anymore. Some debris cleared at 4 L/s, some more cleared 6 L/s, cycled up to 8 L/s, then 10 L/s, down to 5 L/s, up to 8 L/s where more cleared, down to 5 L/s but still debris stuck in there. After the test I found that the separation between the two halves of the filter at the front of the loft had caught quite a few leaves. Have taped this up for tests now on. | 50% clear |
| | 5 | UNSEEDED, backed up until increased to 6 L/s then started to clear, left there for several minutes and probably 90% cleared. Increased to 7 L/s, down to 5 L/s, up to 7 L/s, down to 5 L/s where the large majority had cleared. | 99% clear |
| | 6 | SEEDED - Did not clear, even at the way up to 10 L/s and cycling up and down flow rates. The debris got too compacted at the outlet and couldn't shift. | 5% clear |
| | 7 | UNSEEDED - Did not clear, again even up to 10 L/s. It seems the debris gets compacted together, but also wedged at the outlet too. | 15% clear |
| Medium debris load | 8 | UNSEEDED - Cleared all away at 6 L/s. | 95% clear |
| | 9 | UNSEEDED - did not clear, compacted at the outlet. | 0% clear |
| | 10 | UNSEEDED - Clearing away began about 6 L/s, cycling up and down flow rates cleared most of the debris away. | 95% clear |
| | 11 | UNSEEDED. Began clearing at 6 L/s, increased to 7 L/s, 8 L/s, and down to 4 L/s and up again | 60% clear |

In the present specification and claims (if any), the word 'comprising' and its derivatives including 'comprises' and 'comprise' include each of the stated integers but does not exclude the inclusion of one or more further integers.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for filtering solid and/or non-dissolved contaminants entrained in flowing water, the apparatus comprising:
   a filtering chamber having a first inlet for water containing an entrained solid or non-dissolved contaminants and a first outlet for expelling unfiltered water,
   the filtering chamber being positioned in a housing,
   the filtering chamber including a filtering screen that has a curved or corner portion, the curved or corner portion providing at least a part of a flow path that leads from the inlet to the first outlet and wherein a direction of flow of the water changes when the water flows along the curved or corner portion, the curved portion or corner portion providing at least a part of the flow path that leads from the first inlet to the first outlet;
   wherein the filtering screen is operable to filter solid and/or non-dissolved contaminants from the influent water and filtered water is allowed to pass out of the filtering chamber, and
   the housing having a second outlet through which water that has passed through the filtering screen exits the housing,
   wherein the first inlet of the filtering chamber has a first inlet axis and the first outlet of the filtering chamber has a first outlet axis, the first inlet axis being parallel to the first outlet axis, the first inlet axis being laterally spaced from the first outlet axis and the first inlet being laterally spaced from the first outlet, and water flowing out of the first outlet exits in an opposite direction to water flowing into the first inlet.

2. An apparatus as claimed claim 1 wherein the filtering screen forms at least a part of a wall portion of the filtering chamber, and/or the filtering screen forms at least a part of a floor portion of the filtering chamber.

3. An apparatus as claimed in claim 1 wherein the curved or corner portion causes the water to flow in the opposite direction, and/or the filtering chamber is shaped to provide a generally U-shaped flow path for water flowing from the first inlet to the first outlet.

4. An apparatus as claimed in claim 1 comprising a secondary filtering screen for further filtration of filtered water that exits the filtering chamber, wherein the secondary filtering screen is positioned in the housing and wherein initially filtered water is further filtered by the secondary filtering screen before being expelled from the second outlet, wherein the filtering chamber is operable to be removed from the housing, and the filtering chamber has a handle or grippable portion operable to assist removal of the filtering chamber from the housing.

5. An apparatus as claimed in claim 1 wherein the filtering chamber, in a first filtering configuration, comprises a substantially flat perforated wall or side or portion thereof of the filtering chamber forms an in use floor of the filtering chamber for filtration of debris from the influent water, and/or in a second filtering configuration comprises a wall or side or portion thereof of the filtering chamber, which forms an in use floor of the filtering chamber in the second filtering configuration, includes an inner perforated portion which rises relative to a surrounding unperforated portion, and the inner portion helps to define a curved flow path for the flow of water along the unperforated portion, and/or in the second filtering configuration, the filtering chamber also includes an outer perforated portion which also rises relative to the unperforated portion.

6. An apparatus as claimed in claim 5 wherein a substantially flat perforated wall or side or portion thereof of the filtering chamber forms an in use floor of the filtering chamber for filtration of debris from the influent water.

7. An apparatus as claimed in claim 1 wherein a floor of the filtering chamber includes an inner perforated portion which rises relative to a surrounding unperforated portion, the inner portion helps to define a curved flow path for the flow of water along the unperforated portion, and the filtering chamber also includes an outer perforated portion which also rises relative to the unperforated portion.

8. An apparatus as claimed in claim 1 further comprising a lid for, or as part of, the housing, wherein the lid is removable for accessing the filtering chamber positioned in the housing.

9. An apparatus as claimed in claim 8 wherein the lid further comprises a flange on an underside of the lid, the flange being shaped to engage and retain an outer wall of the filtering chamber, thereby preventing movement of the filter chamber during use.

10. An apparatus as claimed in claim 1 wherein dimensions of the second outlet are selectable for varying flow rates of filtered water being expelled therethrough.

11. An apparatus as claimed in claim 1 comprising a flexible jacket filter for enclosing the filtering chamber and providing additional filtration of contaminants from the filtered water exiting the filtering chamber, and the jacket filter being detachable from the filtering chamber and/or perforations in the jacket filter are equal to or smaller in size than perforations provided in the filtering screen.

12. An apparatus in accordance with claim 1 wherein the filtering chamber comprises a plurality of "U" shaped channels on walls and/or sides and/or the floor thereof or on portions of one or more walls and/or sides and/or the floor, the "U" shaped channels being operable to promote flow within the filtering chamber along the flow path.

13. An apparatus as claimed in claim 1, wherein the housing further includes a third outlet for expelling filtered water and wherein at least one of the second outlet and the third outlet is operable to stop or prevent or limit or not allow flow of filtered water therethrough.

* * * * *